(12) United States Patent
Yamada et al.

(10) Patent No.: US 8,245,994 B2
(45) Date of Patent: Aug. 21, 2012

(54) SEAT APPARATUS FOR VEHICLE

(75) Inventors: Yukifumi Yamada, Toyota (JP); Naoki Goto, Tokai (JP); Shinya Isobe, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 303 days.

(21) Appl. No.: 12/695,294

(22) Filed: Jan. 28, 2010

(65) Prior Publication Data

US 2010/0187397 A1 Jul. 29, 2010

(30) Foreign Application Priority Data

Jan. 29, 2009 (JP) ................................. 2009-018699
Jan. 29, 2009 (JP) ................................. 2009-018720

(51) Int. Cl.
*F16M 13/00* (2006.01)

(52) U.S. Cl. .................... 248/429; 248/424; 297/344.11; 297/344.18; 297/344.24

(58) Field of Classification Search ................... 248/424, 248/425, 429, 430; 297/311, 344.1, 344.11, 297/344.18, 344.24
See application file for complete search history.

(56) References Cited

U.S. PATENT DOCUMENTS

| 4,113,223 A * | 9/1978 | Kakizaki ........................ 248/430 |
| 5,816,555 A * | 10/1998 | Ito et al. ........................ 248/429 |
| 6,616,230 B2 * | 9/2003 | Niikura ........................ 297/311 |
| 6,691,970 B1 * | 2/2004 | Sutton, Sr. ........................ 248/425 |
| 2009/0108615 A1 * | 4/2009 | Akiya et al. ................. 296/65.03 |
| 2010/0187885 A1 * | 7/2010 | Yamada et al. ............ 297/344.1 |

FOREIGN PATENT DOCUMENTS

| JP | 2001-171396 A | 6/2001 |
| JP | 2004-90765 A | 3/2004 |
| JP | 2004-122919 A | 4/2004 |

\* cited by examiner

*Primary Examiner* — Bradley Duckworth
(74) *Attorney, Agent, or Firm* — Buchanan Ingersoll & Rooney PC

(57) ABSTRACT

A seat apparatus for a vehicle includes a longitudinal sliding mechanism including a first lower rail adapted to be fixed to a vehicle floor and extending in a longitudinal direction of the vehicle and a first upper rail slidably supported to the first lower rail, a width-directional sliding mechanism including a second lower rail mounted on the first upper rail and extending in a width direction of the vehicle and a second upper rail slidably supported to the second lower rail and adapted to be fixed to a seat frame member, and an attachment bracket extending in parallel to the second lower rail and including an upper wall portion and first and second engagement portions extending downwardly from the upper wall portion, facing each other in the longitudinal direction, and supported by the first upper rail, wherein the second lower rail is fixed between the first and second engagement portions.

20 Claims, 16 Drawing Sheets

FIG. 18
FIG. 19
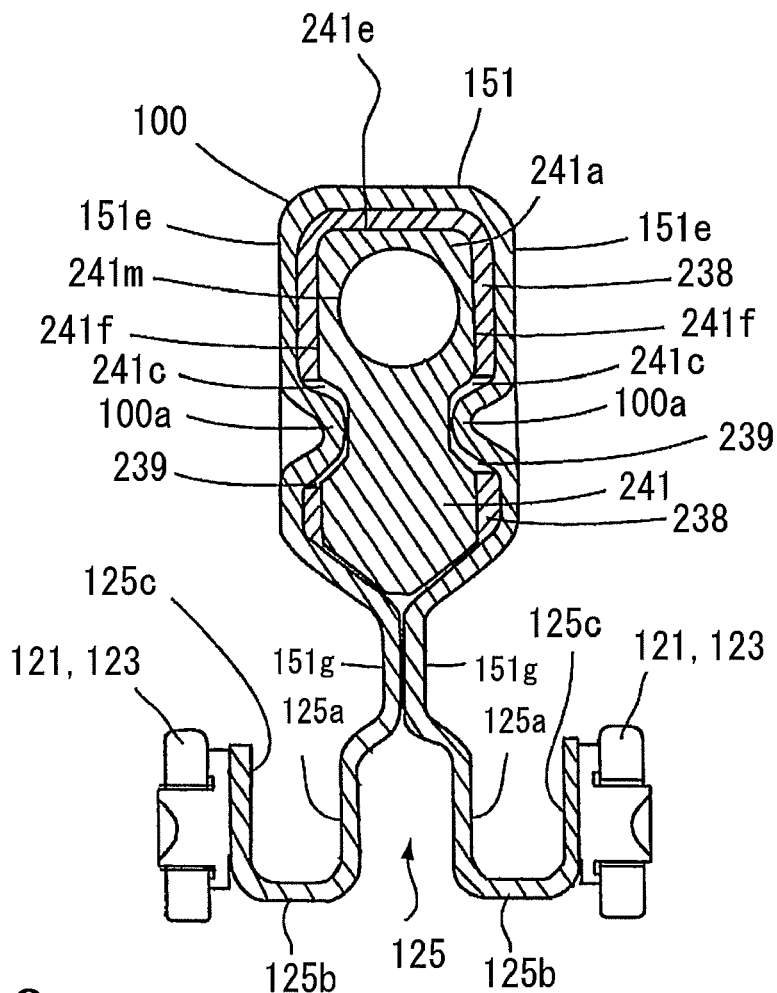
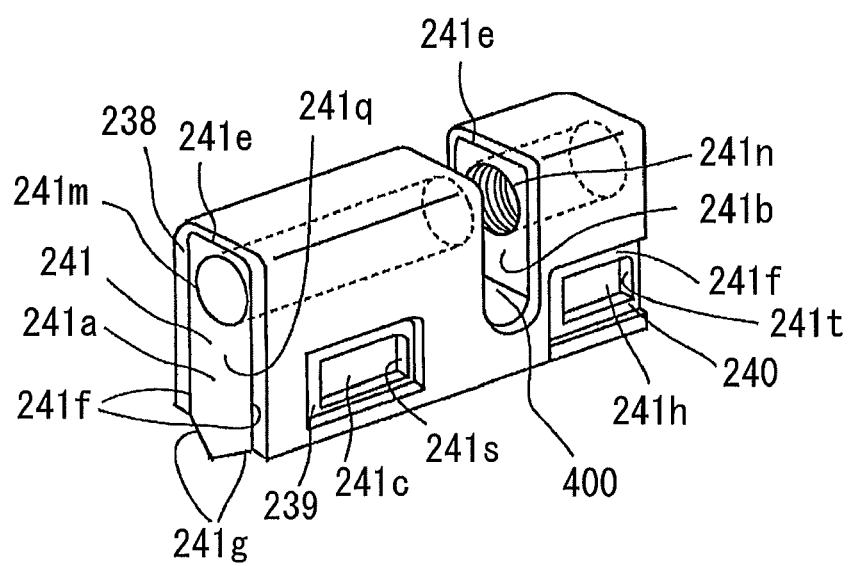

SEAT APPARATUS FOR VEHICLE

CROSS REFERENCE TO RELATED APPLICATIONS

This application is based on and claims priority under 35 U.S.C. §119 to Japanese Patent Application 2009-018699, filed on Jan. 29, 2009 and Japanese Patent Application 2009-018720, filed on Jan. 29, 2009, the entire contents of which are incorporated herein by reference.

TECHNICAL FIELD

This disclosure relates to a seat apparatus for a vehicle.

BACKGROUND DISCUSSION

A known seat apparatus for a vehicle includes a seat belt for fixedly retaining an occupant to a seat of the vehicle. Upper and lower belt anchors supporting both ends of the seat belt, respectively, are generally arranged at a body frame of the vehicle; however, the upper and lower belt anchors may be arranged at a rear portion of a seat frame in order to allow the seat to move or slide to various selectable positions. In case of a vehicle collision, the seat belt is pulled forward by a large tensile force caused by an inertia force acting on the occupant, thereby applying a large load to the upper and lower belt anchors. As a result, a moment caused by the load is generated at the seat frame. That is, an upward detaching load detaching the rear portion of the seat frame from a floor of the vehicle and a compressive load compressively deforming a front portion of the seat frame in a direction toward the floor of the vehicle are generated. Accordingly, it is extremely important for safety reasons to secure the mechanical strength of the seat apparatus against upward detaching and compressive loads of a movable mechanism supporting the seat frame.

For example, a seat apparatus for a vehicle disclosed in JP2004-122919A (hereinafter referred to as Patent Document 1) includes a longitudinal movement mechanism (longitudinal sliding mechanism) and a width-directional movement mechanism (width-directional sliding mechanism). The longitudinal movement mechanism includes a pair of lower members fixed at a floor of the vehicle and a pair of upper members engageable with the respective lower members and movable in a longitudinal direction of the vehicle. The width-directional movement mechanism includes front and rear connecting members (width-directional lower rails) and front and rear moving members (width-directional upper rails). The front and rear connecting members are arranged perpendicular to the upper members so as to cross-connect therebetween. The front and rear moving members are engageable with the respective front and rear connecting members and movable therealong in a width direction of the vehicle. The front and rear moving members of the width-directional movement mechanism are slidably connected to the front and rear connecting members of a seat, respectively. The front and rear connecting members of the width-directional movement mechanism are fixed to attachment members fixedly welded to side inner surfaces of respective front and rear portions of the pair of upper members of the longitudinal movement mechanism. Each of the attachment members has an L-shaped cross-section. In addition, an engaging hook of a first detachment prevention plate externally fixed to each of the front and rear connecting members is engaged with an engaged hook of a second detachment prevention plate externally fixed to each of the front and rear moving members, thereby increasing the strength of the width-directional movement mechanism against an upward detaching load.

However, in the seat apparatus according to Patent Document 1, the front and rear connecting members (width-directional lower rails) are fixed to the attachment members having the L-shaped cross-section and such attachment members are fixed to the side inner surfaces of the respective front and rear portions of the upper members of the longitudinal movement mechanism. The side inner surfaces of the upper members of the longitudinal movement mechanism are fixed to ends of a cantilever mechanism (one-end supporting mechanism). That is, the attachment members are supported to the fixed ends by means of the one-end supporting mechanism. Accordingly, when a large load acts on the front and rear connecting members, a large bending moment is applied to the side inner surfaces that are the fixed ends for the front and rear connecting members, thereby deforming the upper members. Further, strength against a detaching load is taken into consideration for the seat apparatus according to Patent Document 1. However, a point to which a load is applied (engagement point serving as a weight point between the engaging hook of the first detachment prevention plate and the engaged hook of the second detachment prevention plate) is deviated from a supporting center point for supporting the load in the width direction of the front and rear connecting members (width-directional lower rails). Accordingly, a large bending moment due to the above-mentioned load acts on the rear connecting member, thereby deforming the rear connecting member in an upward direction. Meanwhile, a large bending moment due to the above-mentioned load acts on the front connecting member, thereby compressively deforming the front connecting member in a downward direction. Furthermore, it is required to sufficiently increase a thickness of each of the first and second detachment prevention plates in order to increase the strength of the front and rear connecting members against such upward and downward loads. Such case leads to an increase of the weight of the seat apparatus.

A need thus exists for a seat apparatus for a vehicle, which is not susceptible to the drawback mentioned above.

SUMMARY

According to an aspect of this disclosure, a seat apparatus for a vehicle includes a longitudinal sliding mechanism including a first lower rail adapted to be fixed to a vehicle floor and extending in a longitudinal direction of the vehicle and a first upper rail supported to be slidable relative to the first lower rail, a width-directional sliding mechanism including a second lower rail mounted on the first upper rail and extending in a width direction of the vehicle and a second upper rail supported to be slidable relative to the second lower rail and adapted to be fixed to a seat frame member, and an attachment bracket extending in parallel to the second lower rail and including an upper wall portion and first and second engagement portions which extend downwardly from the upper wall portion while facing each other in the longitudinal direction of the vehicle and which are supported by the first upper rail, wherein the second lower rail is fixed between the first and second engagement portions of the attachment bracket.

BRIEF DESCRIPTION OF THE DRAWINGS

The foregoing and additional features and characteristics of this disclosure will become more apparent from the following detailed description considered with the reference to the accompanying drawings, wherein:

FIG. 18 is a cross-sectional view taken along line XVIII-XVIII in FIG. 14 according to the fourth embodiment; and FIG. 19 is a perspective view of a nut member of the seat apparatus according to the fourth embodiment.

DETAILED DESCRIPTION

Figure 1:
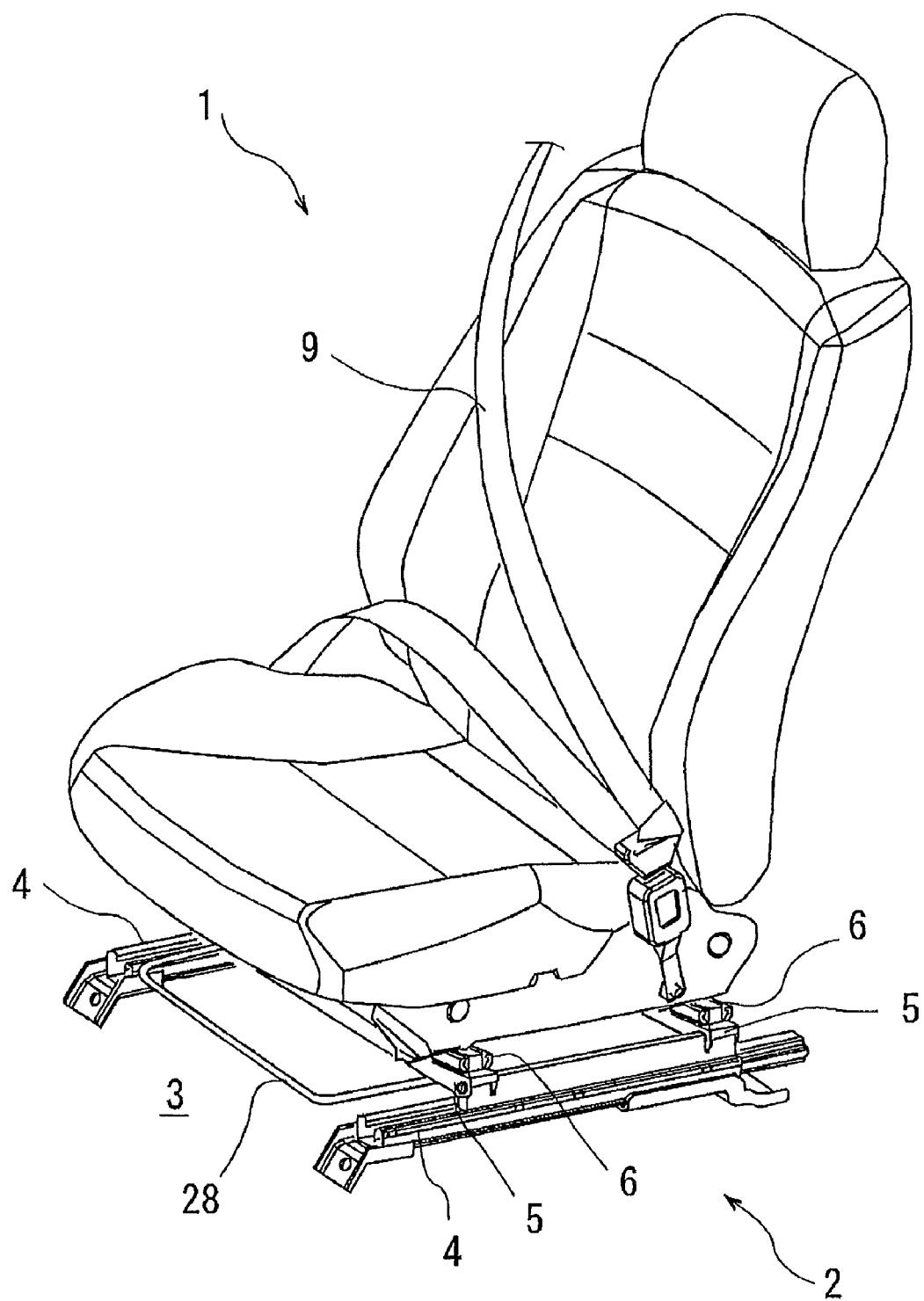
FIG. 1 is a perspective view illustrating a seat to which a seat apparatus for a vehicle according to a first embodiment disclosed here is attached.

A first embodiment of a seat apparatus for a vehicle (seat apparatus) 2 will be explained with illustrations of drawings as follows. In the embodiments, directions and orientations such as left, right, front, rear, top, and bottom correspond to those when viewed from a passenger seated on a seat for a vehicle. The seat apparatus 2 is fixed to a vehicle floor 3. The seat apparatus 2 includes a bilateral pair of longitudinal sliding mechanisms 4 sliding a seat 1 in a longitudinal direction of the vehicle, a longitudinal pair of width-directional sliding mechanisms 6 sliding the seat 1 in a width direction of the vehicle, and attachment brackets 5 attaching the width-directional sliding mechanisms 6 to the longitudinal sliding mechanisms 4. The width-directional sliding mechanisms 6 are fixed to upper portions of the longitudinal sliding mechanisms 4, respectively. The seat 1 is fixed to the width-directional sliding mechanisms 6. The seat belt 9 is fixed to a seat back frame and a seat bottom by upper and lower belt anchors, respectively, at the seat 1.

The longitudinal sliding mechanisms 4 are fixed to the floor 3. Each of the longitudinal sliding mechanisms 4 includes a first lower rail 8 extending in the longitudinal direction of the vehicle and a first upper rail 10 slidably supported by the first lower rail 8.

Figure 6:
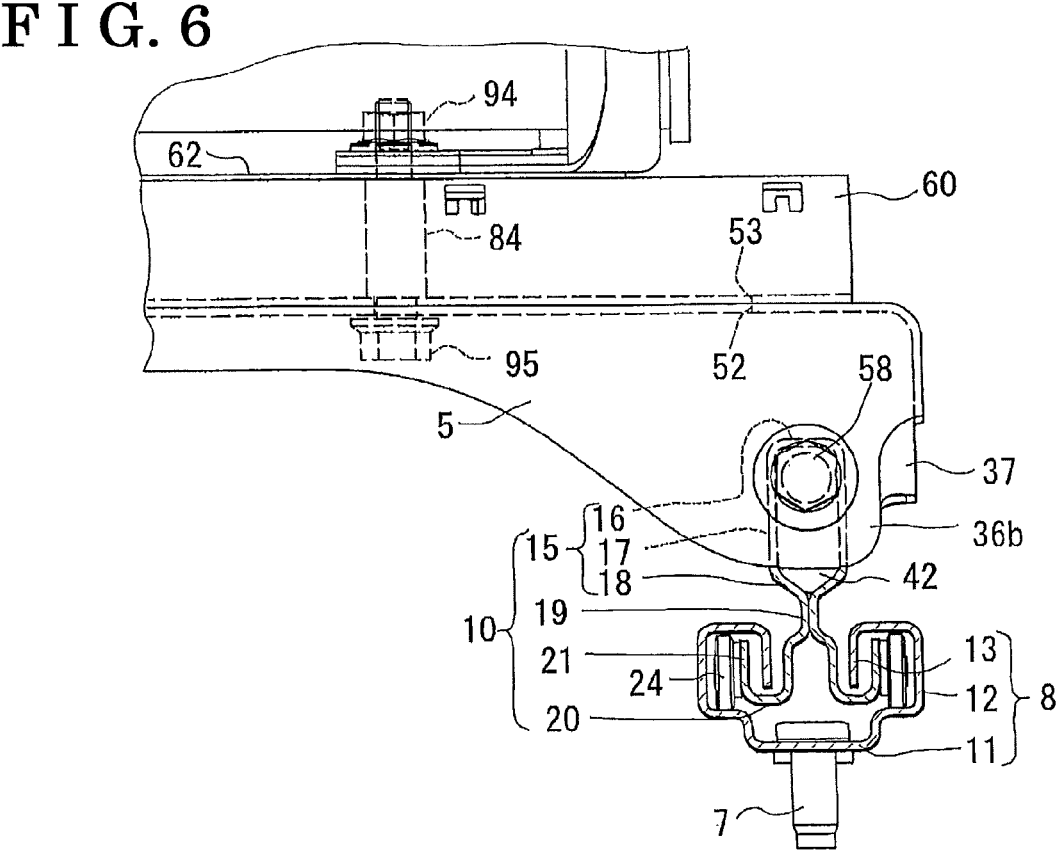
FIG. 6 is an enlarged view of a back face of a right side of the seat apparatus according to the first embodiment.

As illustrated in FIG. 6, each of the first lower rails 8 includes a bottom wall portion 11, a pair of sidewall portions 12, and a pair of flange wall portions 13. The sidewall portions 12 are formed so as to extend upwardly from both ends of the bottom wall portion 11. Upper ends of the respective sidewall portions 12 are folded inwardly downwardly to thereby form the downward extending flange wall portions 13. A plate material is folded to thereby form the first lower rail 8 having an approximately U-shaped cross-section. The first lower rails 8 are fixed to the floor 3 by means of fixing members 7.

Each of the first upper rails 10 includes an upper wall portion 16 formed at the upper side, sidewall portions 17, lower wall portions 18, and an accommodating portion 15 defined by the upper wall portion 16, the sidewall portions 17, and the lower wall portions 18 and having a pouch-shaped cross-section. The sidewall portions 17 are formed so as to be bent downwardly from both ends of the upper wall portion 16 perpendicular thereto. The sidewall portions 17 face each other while having a predetermined distance between each other. Lower ends of the respective sidewall portions 17 facing each other are bent inwardly so as to contact each other at the distal ends, thereby forming the lower wall portions 18. The first upper rail 10 further includes vertical wall portions 19 extending vertically and downwardly from a contact point of the lower wall portions 18, a pair of bottom wall portions 20, and flange wall portions 21. Ends of the respective vertical wall portions 19 are bent outwardly to thereby form the bottom wall portions 20. Outer ends of the respective bottom wall portions 20 are bent upwardly to thereby form the upward extending flange wall portions 21. The first upper rail 10 has an approximately reverse T-shaped cross-section.

The pair of bottom wall portions 20 of the first upper rail 10 is accommodated within the first lower rail 8 in such a way that the vertical wall portions 19 penetrate between the flange wall portions 13 of the first lower rail 8 and that the flange wall portions 21 are arranged between the sidewall portions 12 of the first lower rail 8 and the flange wall portions 13 of the first lower rail 8. A plurality of rolling members 24 is disposed between an inner surface of each of the sidewall portions 12 of the first lower rail 8 and an outer surface of each of the flange portions 21 of the first upper rail 10 while being spaced apart from one another in a longitudinal direction of the first upper and lower rails 10, 8, which corresponds to the longitudinal direction of the vehicle. The first upper rail 10 is slidably supported by the rolling members 24 relative to the first lower rail 8 in the longitudinal direction of the first upper and lower rails 10 and 8. A sliding movement of the first upper rails 10 relative to the first lower rails 8 allows the seat 1 to be adjustable in the longitudinal direction of the vehicle and locked at a desired position in the longitudinal direction by a lock-unlock mechanism 26 (see FIG. 2). Two sets of the first lower rail 8 and the first upper rail 10 are arranged in parallel with each other while having a predetermined distance between each other in a width direction of the first upper and lower rails 10 and 8, which corresponds to the width direction of the vehicle. Detailed explanations of the lock-unlock mechanism 26 are omitted in the first embodiment. The lock-unlock mechanism 26 is configured so that engagement projecting portions formed at a lock member are biased so as to fit into a plurality of engagement holes formed at the first upper rails 10 in conjunction with a plurality of engagement holes formed at the first lower rails 8 in a longitudinal direction of the first lower rails 8 (longitudinal direction of the vehicle) to thereby establish a locked condition of the seat 1. When the engagement between the engagement protruding portions and the engagement holes of the first upper and lower rails 10 and 8 is disengaged, the locked condition of the seat 1 is released. Moreover, such lock and unlock operations of the lock-unlock mechanism 26 are performed by a handle 28 arranged at a lower portion of a front side of the seat 1 (see FIG. 1).

Figure 4:
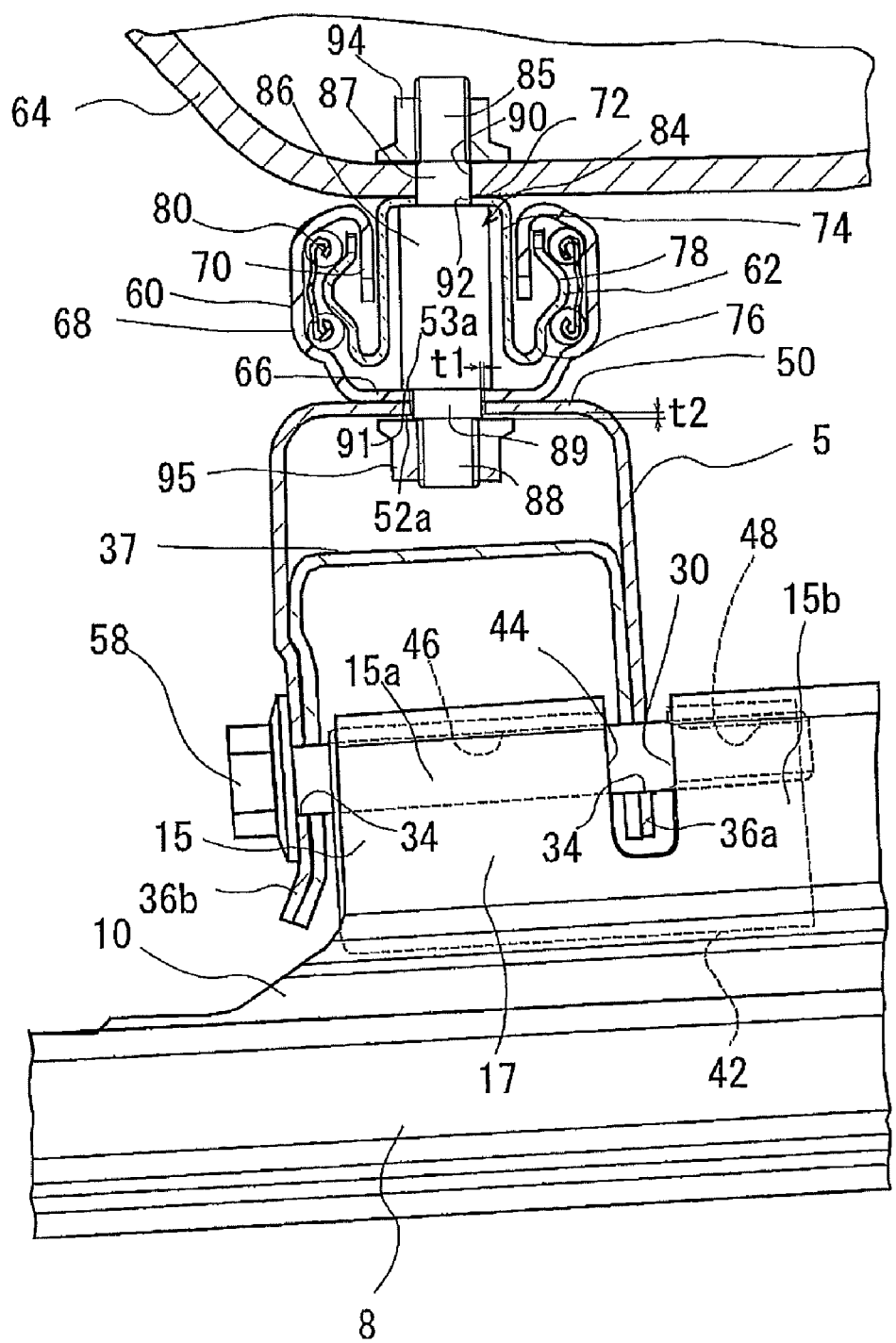
FIG. 4 is an enlarged view illustrating a portion of a front side of the seat apparatus according to the first embodiment.
Figure 5:
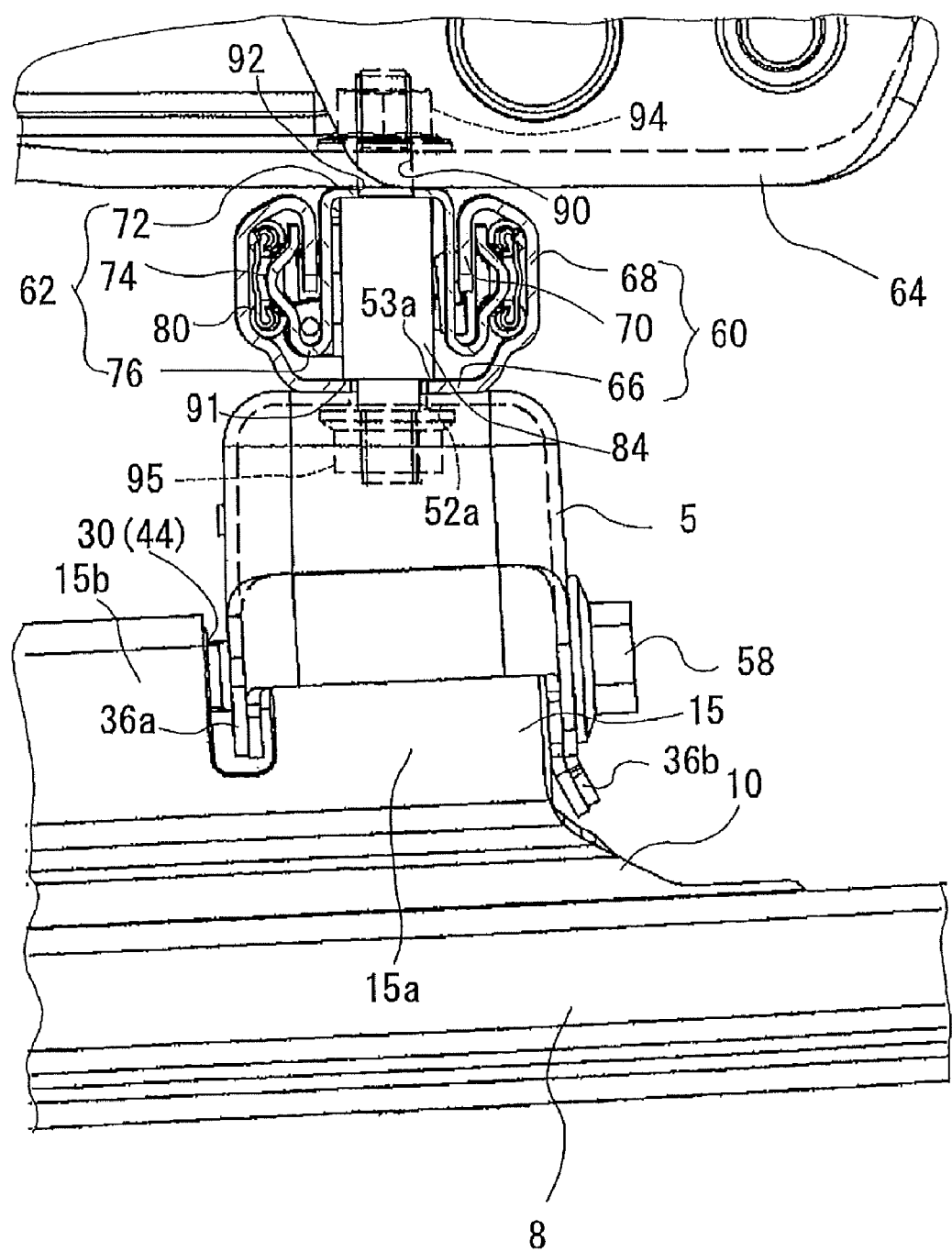
FIG. 5 is an enlarged view illustrating a portion of a rear side of the seat apparatus according to the first embodiment.

The first upper rail 10 includes the accommodating portion 15 projecting upwardly from a slide portion of the first upper rail 10, which is inserted in the first lower rail 8, along the longitudinal direction. As shown in FIGS. 4 and 5, slits 30 having an upward opening are formed at longitudinal front and rear ends of the accommodating portion 15, respectively. The slits 30 are formed at a predetermined distance away from the respective front and rear ends of the accommodating portion 15. First accommodating portions 15a are formed at the front and rear ends of the accommodating portion 15, respectively, and second accommodating portions 15b are formed in an intermediate portion of the accommodating portion 15 in the longitudinal direction in such a way that the slits 30 are arranged between the first and second accommodating portions 15a and 15b at the front and rear ends, respectively. That is, an axial end portion of each of the accommodating portions 15 is divided into the first accommodating portion 15a and the second accommodating portion 15b by the slit 30. Nut members 42 that are approximately rectangular solids are inserted into the front and rear ends of the accommodating portion 15 (see FIG. 4), respectively. Recessed portions are formed on side surfaces of each of the nut members 42. The sidewall portions 17 of the first upper rail 10 are externally riveted relative to the recessed portions of the nut member 42, thereby fixing the nut member 42 within the accommodating portion 15. A slit 44 having a shape conforming to the slit 30 is formed in the nut member 42. A through-hole 46 is formed in the nut member 42 so as to penetrate through from one end to the other end of the nut member 42 in a direction perpendicular to the slit 44. An internally threaded portion 48 is formed in the through-hole 46 in an intermediate portion of the through-hole 46 in the longitudinal direction thereof (to the right in FIG. 4). A portion of the nut member 42 where the internally threaded portion 48 is not formed is accommodated within the first accommodating portion 15a while a portion of the nut member 42 where the internally threaded portion 48 is formed is accommodated in the second accommodating portion 15b. Engagement portions 36a of each of the attachment brackets 5, which will be described below, are inserted in the respective slits 30 and 44 from an upper side of the first upper rails 10.

Figure 2:
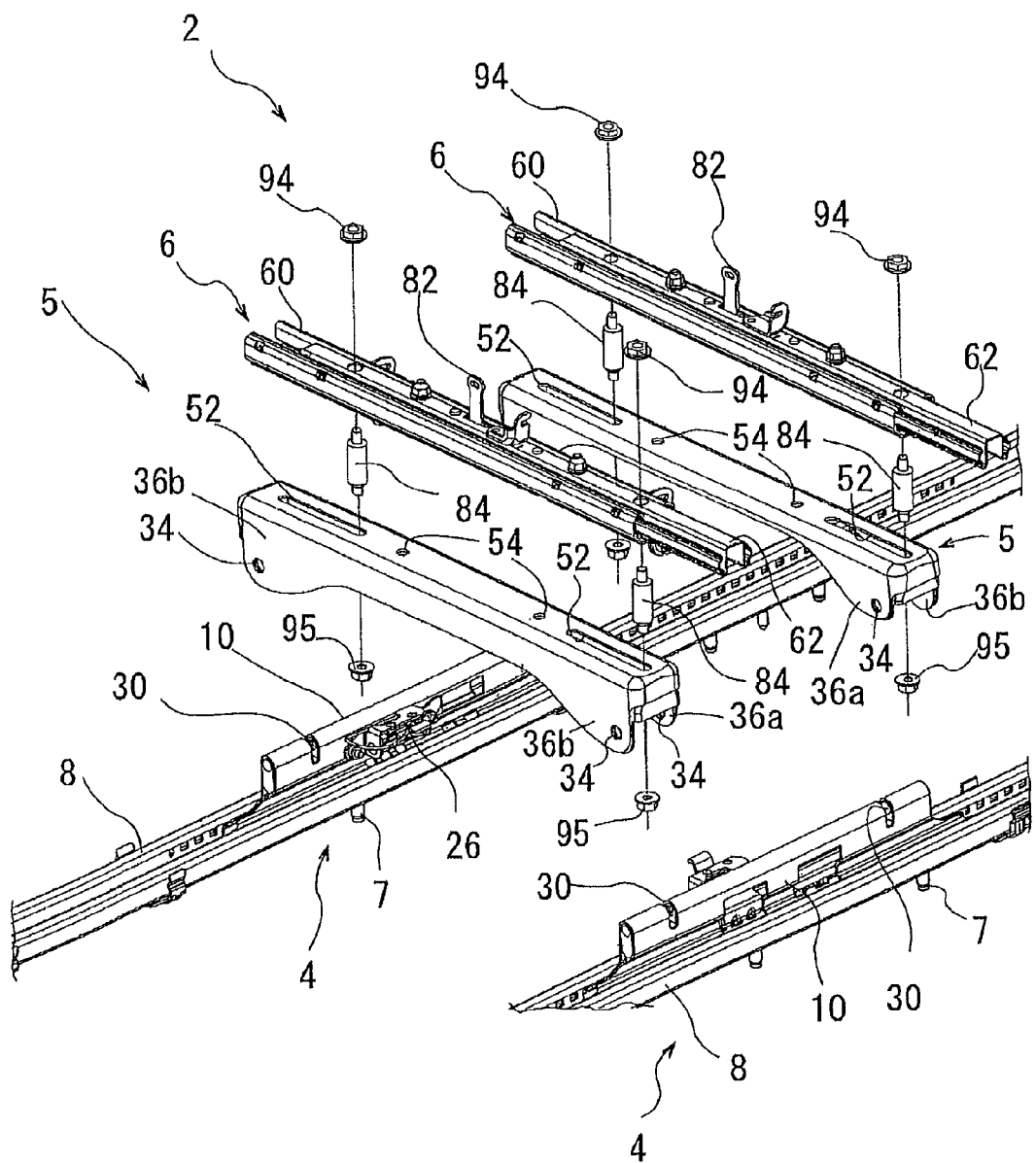
FIG. 2 is a perspective view of an assembly of the seat apparatus according to the first embodiment.

As shown in FIG. 2, FIG. 4, and FIG. 5, the attachment bracket 5 is formed by an elongated member having an approximately U-shaped cross-section. The attachment brackets 5 are respectively arranged so as to be laid across oppositely-facing front ends of the first upper rails 10 and across oppositely-facing rear ends of the first upper rails 10. A pair of engagement portions 36a and 36b serving as first and second engagement portions, facing each other, and forming a flange shape is formed at each of side ends of the attachment bracket 5. The engagement 36a and 36b project downwardly from the respective side ends of the attachment bracket 5. The engagement portions 36a and 36b include engagement holes 34, respectively. The engagement holes 34 of the engagement portions 36a and 36b face each other and each of the engagement holes 34 has an opening in the longitudinal direction. As illustrated in FIG. 4, when the engagement portion 36a is inserted in the slit 30, the first accommodating portion 15a of the first upper rail 10 is positioned between the engagement portions 36a and 36b. At this time, the engagement hole 34 of the engagement portion 36a opens into an inside of the accommodating portion 15 and the engagement hole 34 of the engagement portion 36b conforms to an opening end (through-hole 46 of the nut member 42) of the accommodating portion 15. Then, a fastening bolt 58 serving as a connecting member is inserted between the engagement holes 34 facing each other within the accommodating portion 15 and afterward is screwed with the internally threaded portion 48 of the nut member 42 so as to be fastened thereto. In this way, the fastening bolt 58 is supported between the engagement portions 36a and 36b configuring a both-end supporting mechanism for connecting the attachment bracket 5 to the first upper rails 1. Thus, the attachment bracket 5 is firmly attached to the front ends of the first upper rails 10. Similarly, the attachment bracket 5 is attached to the rear ends of first upper rails 10 with the nut members 42 and the fastening bolts 58 as illustrated in FIG. 5.

Figure 7:
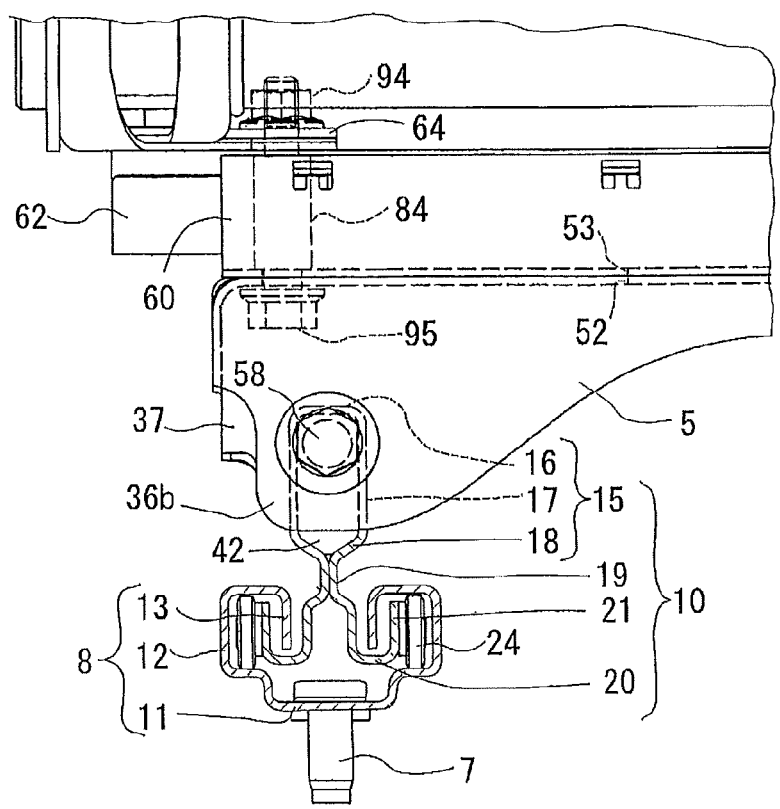
FIG. 7 is an enlarged view of a back face of a left side of the seat apparatus according to the first embodiment.

A reinforcing member 37 is welded and attached to an inside of the engagement portions 36a and 36b of the attachment bracket 5 so as to form a rectangular configuration, thereby increasing the rigidity of the first and second engagement portions 36a and 36b. A pair of elongated holes 52 is formed in an upper wall portion 50 of the attachment bracket 5 so as to penetrate therethrough. Each of the elongated holes 52 is positioned in the center of a width direction (longitudinal direction of the vehicle) of the attachment bracket 5 while extending in a predetermined distance (distance in which the first and second engagement portions 36a and 36b are formed) along a longitudinal direction (width direction of the vehicle) of the attachment bracket 5 (see FIGS. 2, 6, and 7). Further, attachment holes 54 for attaching a second lower rail 60 to the attachment bracket 5, which will be described below, are formed in the upper wall portion 50 of the attachment bracket 5.

Figure 3:
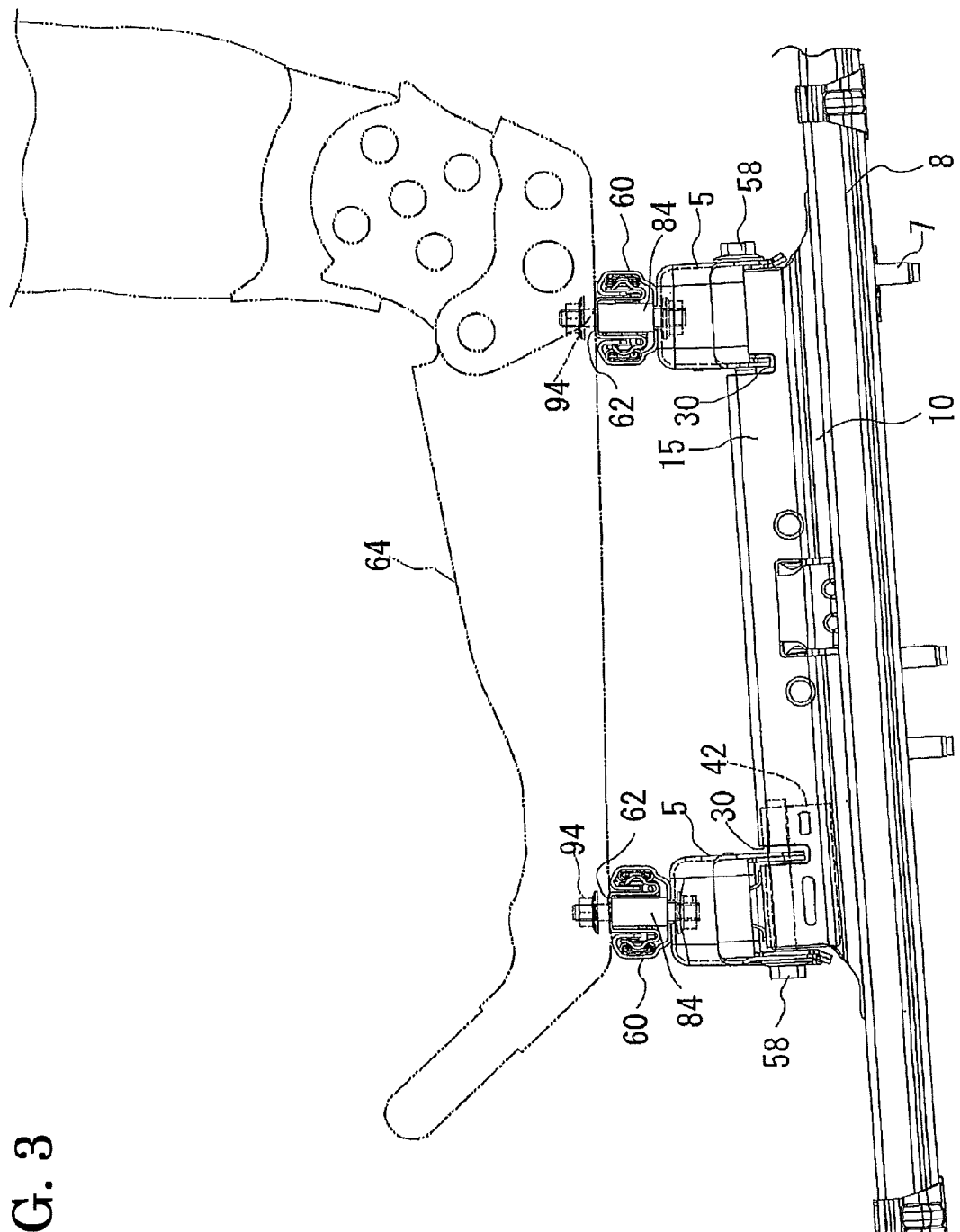
FIG. 3 is a lateral view of the seat apparatus according to the first embodiment.

As shown in FIGS. 2 and 3, the longitudinal pair of width-directional sliding mechanisms 6 is fixed to the attachment brackets 5 so as to be in parallel therewith. Each of the width-directional sliding mechanisms 6 includes the second lower rail 60 extending along the width direction and a second upper rail 62 slidably supported by the second lower rail 60. A seat frame (seat frame member) 64 of the vehicle is fixed to the second upper rails 62.

As shown in FIGS. 4 and 5, the second lower rail 60 includes a bottom wall portion 66, a pair of sidewall portions 68 extending upwardly from both ends of the bottom wall portion 66, and a pair of flange wall portions 70 inwardly bent from respective upper ends of the sidewall portions 68 so as to extend downwardly. A plate material is folded and bent so as to form the second lower rail 60 having an approximately U-shaped cross-section. A pair of elongated holes 53 conforming to the elongated holes 52 of the attachment bracket 5 is formed in the bottom wall portion 66 of the second lower rail 60 (see FIGS. 6 and 7). Load transmitting pins 84, which will be described below, are inserted in the elongated holes 53. Each of the load transmitting pins 84 penetrates through each of the elongated holes 53 in a condition where a small clearance t1 is defined between the elongated hole 53 and a lower shaft portion 89 of the load transmitting pin 84. Such second lower rails 60 are fixed to the respective attachment brackets 5 via the attachment holes 54 with fixing members so as to be in parallel with the attachment brackets 5.

The second upper rail 62 includes an upper wall portion 72 formed at the upper side, a pair of sidewall portions 74 bent downwardly from both ends of the upper wall portion 72 in a direction perpendicular thereto and facing each other in a predetermined distance between each other, a pair of bottom wall portions 76 curved outwardly from respective lower ends of the sidewall portions 74 facing each other, and a pair of flange wall portions 78 extending upwardly from the respective lower ends of the bottom wall portions 76.

The pair of bottom wall portions 76 of the second upper rail 62 is accommodated within the second lower rail 60 in such a way that the sidewall portions 74 are inserted between the flange wall portions 70 of the second lower rail 60 and that the flange wall portions 78 are arranged between the sidewall portions 68 of the second lower rail 60 and the flange wall portions 70 of the second lower rail 60. A plurality of rolling members 80 is arranged between an inner surface of each of the sidewall portions 68 of the second lower rail 60 and an outer surface of each of the flange portions 78 of the second upper rail 62 while being spaced apart from one another in the longitudinal direction of the second upper and lower rails 62 and 60. The second upper rails 62 are slidably supported by the rolling members 80 relative to the second lower rails 60 along the longitudinal direction (width direction of the vehicle) of the second upper and lower rails 62 and 60.

A sliding movement of the second upper rails 62 relative to the second lower rails 60 is restricted by the length of the elongated holes 53 of the second lower rails 60 and by the length of the elongated holes 52 of the attachment brackets 5, thereby enabling the seat 1 to be adjusted in the width direction of the vehicle. Each of the second upper rails 62 is locked by a lock-unlock mechanism at desired positions in the width direction. The unlock-lock mechanism is provided with a biasing mechanism configured to bias the second upper rail 62 relative to the second lower rail 60 in such a way that engagement projecting portions formed at a lock member are fitted into a plurality of engagement holes formed in the second upper rail 62 in conjunction with a plurality of engagement holes formed in the second lower rail 60 in the longitudinal direction. Thus, the second upper rails 62 are brought into a locked condition. When an engagement between the engagement protruding portions and the engagement holes of the second upper and lower rails 62 and 60, is disengaged, the locked condition of the second upper rails 62 is released. Further, such lock and unlock operations of the lock-unlock mechanism are conducted when release levers 82 arranged at the second upper rails 62, respectively, are operated by an operating lever connected to the release levers 82 by a push-pull cable (see FIG. 2).

The seat frame 64 is fixed to the upper wall portions 72 of the second upper rails 62 by the load transmitting pins 84 serving as load transmitting members. As illustrated in FIG. 4, each of the load transmitting pins 84 includes an upper externally threaded portion 85 formed at the top end, a lower externally threaded portion 88 formed at the lower end, an upper shaft portion 86 formed in the intermediate portion, a cylindrical shaft portion 87 arranged between the upper externally threaded portion 85 and the upper shaft portion 86, and a lower shaft portion 89 arranged between the lower externally threaded portion 88 and the upper shaft portion 86. The upper shaft portion 86 of the load transmitting pin 84 has an external diameter larger than external diameters of the upper externally threaded portion 85 and the lower externally threaded portion 88. The cylindrical shaft portion 87 has an external diameter smaller than the external diameter of the upper shaft portion 86. The lower shaft portion 89 has an external diameter smaller than the external diameter of the upper shaft portion 86 and larger than the external diameter of the lower externally threaded portion 88. A stepped section 91 is formed between the upper shaft portion 86 and the lower shaft portion 89. Fixing holes 90 are formed in the seat frame 64 so as to penetrate therethrough and fixing holes 92 are formed in the upper wall portion 72 of the second upper rail 62 so as to penetrate therethrough. Each of the fixing holes 90, 92 has a diameter larger than the external diameters of the upper externally threaded portion 85 and the cylindrical shaft portion 87 and smaller than the external diameter of the upper shaft portion 86. The upper externally threaded portion 85 and the cylindrical shaft portion 87 of the load transmitting pin 84 are inserted in the fixing holes 90 and 92. Further, flanged nuts 94 are respectively inserted into the upper externally threaded portions 85 of the load transmitting pins 84 so as to be fastened thereto, thereby fixing the seat frame 64 to the second upper rails 62. Lower portions of the load transmitting pins 84 are respectively inserted in the elongated holes 52 of the attachment brackets 5 and the elongated holes 53 of the second lower rails 60. The external diameter of the upper shaft portion 86 of each of the load transmitting pins 84 is designed to be larger than the width of the elongated holes 52 and 53 while the external diameter of the lower shaft portion 89 is slightly smaller than the width of the elongated holes 52 and 53 so as to penetrate therethrough while having the small clearance t1 relative to the elongated holes 52 and 53. Further, the stepped section 91 of the load transmitting pin 84 is configured so as to make contact with an upper peripheral edge surface 53a of the elongated hole 53. Furthermore, an axial length of the lower shaft portion 89 of the load transmitting pin 84 is set to be slightly larger than a total length of a thickness of the upper wall portion 50 of the attachment bracket 5 and a thickness of the bottom wall portion 66 of the second lower rail 60. Accordingly, when a flanged nut 95 serving as a flanged portion is screwed with the lower externally threaded portion 88 so as to be fastened thereto, a small clearance t2 is formed between a lower surface of the upper wall portion 50 of the attachment bracket 5 and the flanged nut 95. An external diameter of the flanged nut 95 is set to be larger than the width of the elongated holes 52, 53. Accordingly, when the load transmitting pin 84 is pulled upward, the flanged bracket 95 makes contact with a lower peripheral edge surface 52a of the elongated hole 52. Thus, the second upper rails 62 to which the seat frame 64 is fixed are guided by the elongated holes 52 and 53 via the load transmitting pins 84, thereby sliding within the length of the elongated holes 52 and 53 relative to the second lower rails 60 in the width direction of the vehicle. Moreover, a load applied from the seat frame 64 when a front collision of the vehicle occurs, is not fully applied between the second upper rails 62 and the second lower rails 60 in the width-directional sliding mechanisms 6 and is transferred to the attachment brackets 5 by the load transmitting pins 84. For example, the load is a detaching load at the rear side of the seat apparatus 2 seen in FIG. 4 while being a compressive load at a front side of the seat apparatus 2 seen in FIG. 5.

An operation of the seat apparatus 2 described above will be explained as follows. The seat belt 9 is attached to the seat back frame and the seat bottom frame by the upper and lower belt anchors, respectively, at the seat 1 according to the first embodiment. Accordingly, for example, when the vehicle collides at the front thereof, an inertia force of an occupant of the vehicle is applied to the seat apparatus 2 via the seat belt 9. In this case, a forward turning force that makes the occupant to topple forward is generated and therefore causes a detaching force to act on the rear side (to the right in FIG. 3) of the seat apparatus 2 and a compressive load to act on the front side (to the left in FIG. 3) of the seat apparatus 2.

A case where a detaching load acts between the second lower rail 60 and the second upper rail 62 at the rear side of the seat apparatus 2 will be described below. Firstly, an upward load is transmitted from the seat frame 64 via the flanged nuts 94 to the load transmitting pins 84 (see FIG. 5). Next, the upward load is transmitted from the load transmitting pins 84 to the second upper rail 62 and thereafter acts as the detaching load between the second upper rail 62 and the second lower rail 60. Under this condition, the load transmitting pins 84 fixed to the second upper rail 62 are pulled upward, thereby making the flanged nuts 95 contact with the lower peripheral edge surfaces 52a (located in the center of the width direction of the attachment bracket 5) of the elongated holes 52 formed in the upper wall portion 50 of the attachment bracket 5. As a result, the upward load is partially transmitted to the attachment bracket 5. Consequently, the upward load is received by each of the second upper rail 62, the second lower rail 60, and the attachment bracket 5. Further, the engagement portions 36a and 36b of the attachment bracket 5 are attached to the accommodating portions 15 of the first upper rails 10 with the fastening bolts 58 by means of the both-end supporting mechanism. Accordingly, the upward load from the center of the width direction of the elongated holes 52 does not generate a large bending moment as seen in a conventional seat apparatus for a vehicle and thus is applied to the first upper rails 10 as a shear force mainly applied from the engagement portions 36a and 36b to the fastening bolts 58. Further, the fastening bolt 58 is screwed with the nut member 42 fixed integrally within the accommodating portion 15 of the first upper rail 10. Accordingly, a stress concentration is prevented at the first upper rails 10 and the load is applied to the first upper rails 10 provided adjacent to the floor 3. As a result, the upper load is released to the floor 3.

In addition, a case where a compressive load acts between the second lower rail 60 and the second upper rail 62 at the front side of the seat apparatus 2 will be explained as follows. Firstly, a downwardly compressive force is transmitted from the seat frame 64 via the stepped section 91 defined between the upper shaft portion 86 and the cylindrical shaft portion 87 of each of the load transmitting load pins 84 thereto (see FIG. 4). Next, the downwardly compressive force is transmitted from the seat frame 64 to the second upper rail 62 and thus acts as the compressive load between the second upper rail 62 and the second lower rail 60. Under this condition, the load transmitting pins 84 fixed to the second upper rail 62 are pulled downward, thereby allowing the stepped sections 91 defined between the upper shaft portions 86 and the lower shaft portions 89 to press the upper peripheral edge surfaces 53a of the elongated holes 53 formed in the bottom wall portion 66 of the second lower rail 60 and an upper surface (located in the center of the width direction of the attachment bracket 5) of the upper wall portion 50 of the attachment bracket 5. As a result, the downwardly compressive load is transmitted to the attachment bracket 5 and therefore is received by each of the second upper rail 62, the second lower rail 60, and the attachment bracket 5. In the same way as the case of the detaching load, the downwardly compressive load is received by the both-end supporting mechanism and thus is applied to the first upper rails 10 provided adjacent to the floor 3. Consequently, the downwardly compressive load is released to the floor 3.

Moreover, when the seat 1 is slid to one lateral end (to the left end seen in FIG. 6) of the width-directional sliding mechanisms 6 as shown in FIG. 6, each of the load transmitting pins 84 at the right side of the vehicle is positioned away from a right overhead position of the first upper rail 10 at the right side in accordance with the lateral sliding movement of the seat 1. In this case, each of the load transmitting pins 84 at the other lateral end (the left side seen in FIG. 7) is positioned right above the first upper rail 10 at the left side. Accordingly, an upward or downward load transmitted from the load transmitting pins 84 is received by the first upper rails 10 arranged adjacent to the floor 3 and therefore is released to the floor 3. Additionally, in the case where each of the load transmitting pins 84 at the right side of the vehicle is positioned away from the right overhead position of the first upper rail 10 in accordance with the lateral sliding movement of the seat 1, the attachment brackets 5 are attached to the first upper rails 10 facing each other so as to be laid thereacross in such a way that the side ends of the respective attachment brackets 5 are received by the both-end supporting mechanism at four positions in total. Accordingly, the load from the load transmitting pins 84 is received by each of the second upper rails 62, the second lower rails 60, the attachment brackets 5, and the first upper rails 10. Consequently, the first upper rails 10 of the longitudinal sliding mechanisms 4 and the second lower rails 60 of the width-direction sliding mechanism 6 are firmly connected to one another without the occurrence of a large bending moment and a stress concentration.

According to the seat apparatus 2 configured as described above, a load applied from the second lower rails 60 of the width-directional mechanisms 6 to the first upper rails 10 of the longitudinal sliding mechanism 4 is supported at the pairs of engagement portions 36a and 36b of the side ends of the attachment brackets 5 by means of the both-end supporting mechanism. Accordingly, compared to a conventional case where a load from a seat frame is supported by a one-end supporting mechanism, a large bending moment is not generated in the first embodiment. Consequently, even when a relatively lightweight member is applied to the attachment brackets 5 attaching the second lower rails 60 of the longitudinal sliding mechanisms 4 to respective upper portions of the first upper rails 10 of the width-directional mechanisms 6, the second lower rails 60 are firmly connected to the first upper rails 10.

Moreover, the engagement portions 36a of the attachment bracket 5 are inserted into the slits 30 formed in the respective upper portions of the first upper rails 10 and the fastening bolts 58 are inserted into two pairs of engagement holes 34 of the attachment bracket 5 so as to be fixed within the respective accommodating portions 15 in a condition where each of the first accommodating portions 15a is arranged between the engagement portions 36a and 36b. Thus, the both-end supporting mechanism is configured to thereby firmly connect the first upper rails 10 of the longitudinal sliding mechanisms 4 to the second lower rails 6 of the width-directional sliding mechanisms 6. In addition, connecting positions between the first upper rails 10 and the second lower rail 60 are easily changed only by changing positions of the slits 30 at the first upper rail 10.

Further, the fastening bolts 58 are only screwed with the nut members 42, respectively, thereby promptly and easily establishing the both-end supporting mechanism to thereby firmly connect the first upper rails 10 of the longitudinal sliding mechanisms 4 to the second lower rails 6 of the width-directional sliding mechanisms 6.

Furthermore, the upper shaft portion 86 of each of the load transmitting pins 84 is moved along the elongated holes 52 and 53 of the attachment bracket 5 and the second lower rail 60 under the conditions that the upper shaft portion 86 and the upper externally threaded portion 85 are fixed to the second upper rail 62 and that the lower shaft portion 89 penetrates through the elongated holes 52 and 53. Accordingly, the second upper rails 62 are smoothly slid relative to the second lower rails 60.

Moreover, even when a compressive load is downwardly applied to the second upper rail 62, each of the load transmitting pins 84 is configured so that the upper shaft portion 86 and the upper externally threaded portion 85 are fixed to the second upper rail 62 and that the stepped section 91 formed at a lower end of the upper shaft portion 86 makes contact with the upper peripheral edge surface 53a of the elongated hole 53 and presses the upper wall portion 50 of the attachment bracket 5. Accordingly, the downwardly compressive load received by the second upper rail 62 is transmitted to the attachment bracket 5 and thus partially received by the attachment bracket 5. Meanwhile, when a detaching load is applied to the second upper rail 62, the flanged nuts 95 each attached to a lower end of the lower shaft portion 89 extending downwardly from the upper shaft portion 86 make contact with the lower peripheral edge surfaces 52a of the elongated holes 52 of the attachment bracket 5. Accordingly, the detaching load to be applied to the second upper rail 62 is transmitted to the attachment bracket 5 and thus is partially received by the attachment bracket 5. Consequently, the detaching load transmitted from the second upper rail 62 is not required to be received by the rolling members 80 slidably supporting the second upper rail 62 and by the second lower rail 60. Furthermore, the detaching load transmitted from the second upper rail 62 is received by the attachment bracket 5 via the load transmitting pins 84 and divided by the second upper rail 62, the second lower rail 60, and the attachment bracket 5, therefore increasing the mechanical strength of the seat apparatus 2 and improving the safety thereof.

A second embodiment of a seat apparatus 102 for a vehicle will be explained with reference to illustrations of drawings as follows. The seat apparatus 102 includes a rotation mechanism 104 rotating the seat 1 by 180 degrees between the width-directional sliding mechanisms 6 and the seat frame 64 of the first embodiment. Further, the seat apparatus 102 of the second embodiment differs from the seat apparatus 2 of the first embodiment in that a load transmitting pin (load transmitting member) 105 has a different shape from the shape of the load transmitting pin 84.

Figure 8:
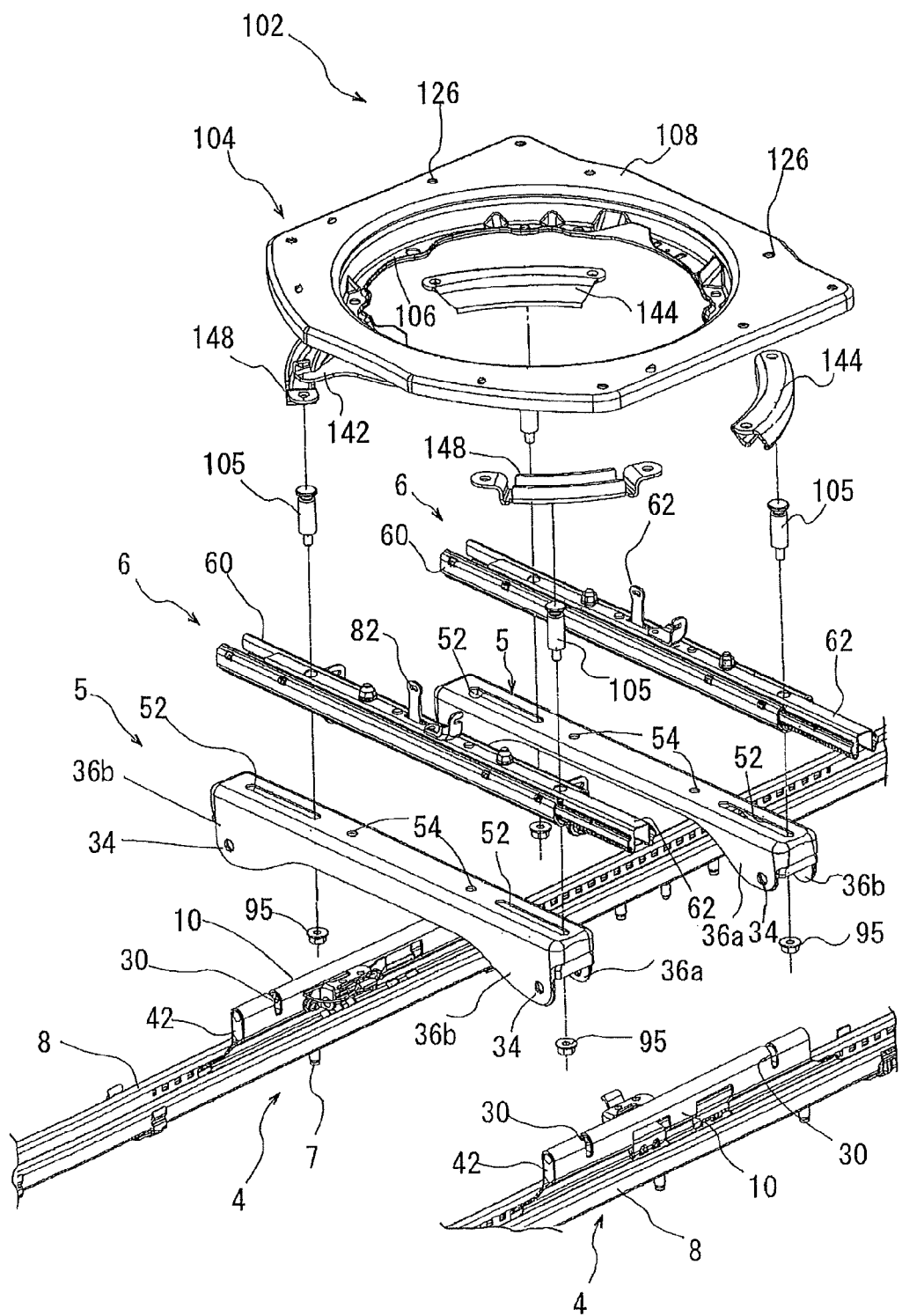
FIG. 8 is a perspective view of an assembly of the seat apparatus according to a second embodiment disclosed here.
Figure 9:
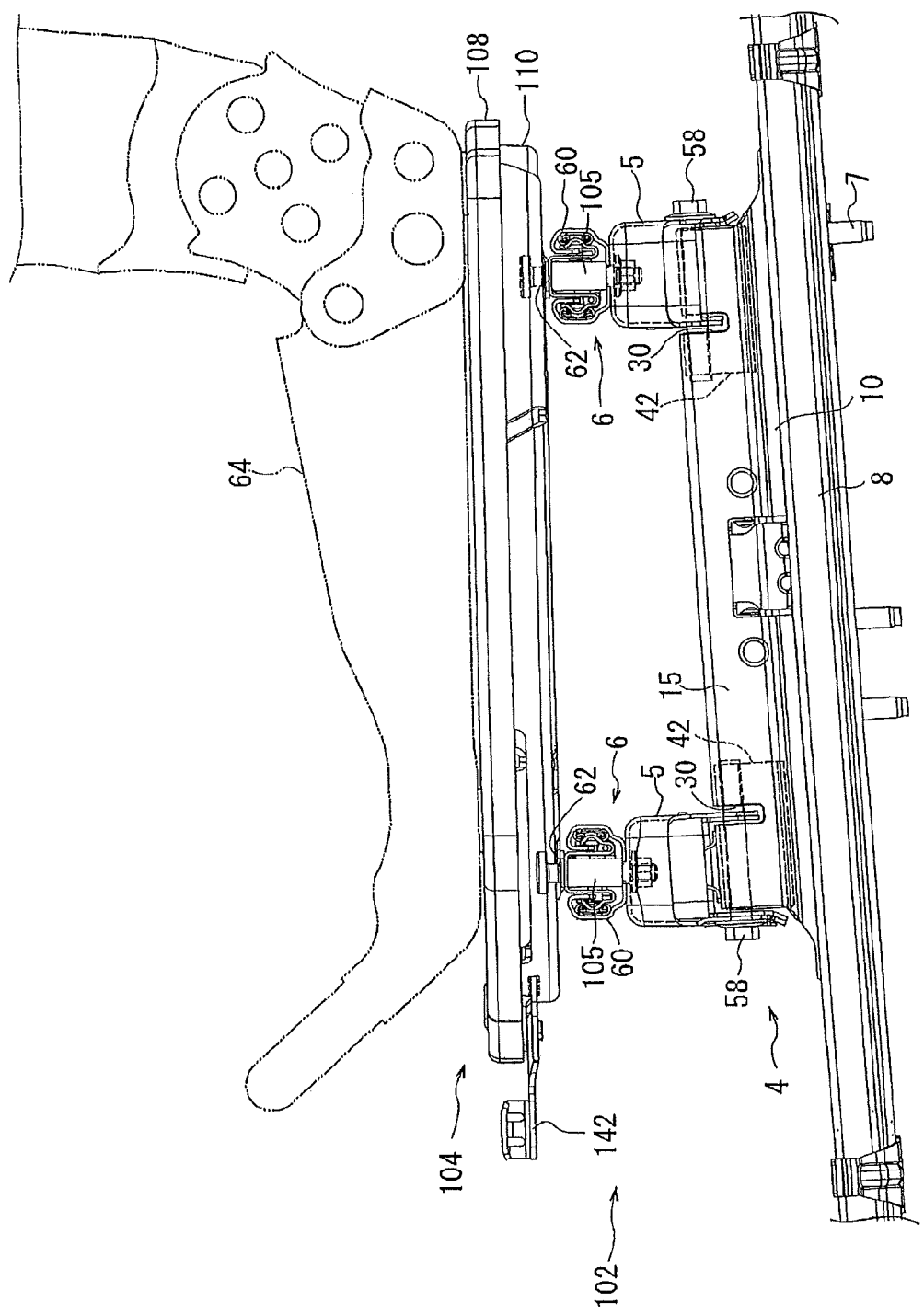
FIG. 9 is a lateral view of the seat apparatus according to the second embodiment.

As shown in FIG. 8 and FIG. 9, the rotation mechanism 104 includes a rotary plate lower rail 106 fixed to the second upper rails 62 of the width-directional mechanisms 6, a first rotary plate upper rail 108 fixed to the seat frame 64 and rotatably sliding relative to the rotary plate lower rail 106, and a second rotary plate upper rail 110 fixed to a lower portion of the first rotary plate upper rail 108 and rotatably sliding relative to the rotary plate lower rail 106.

Figure 10:
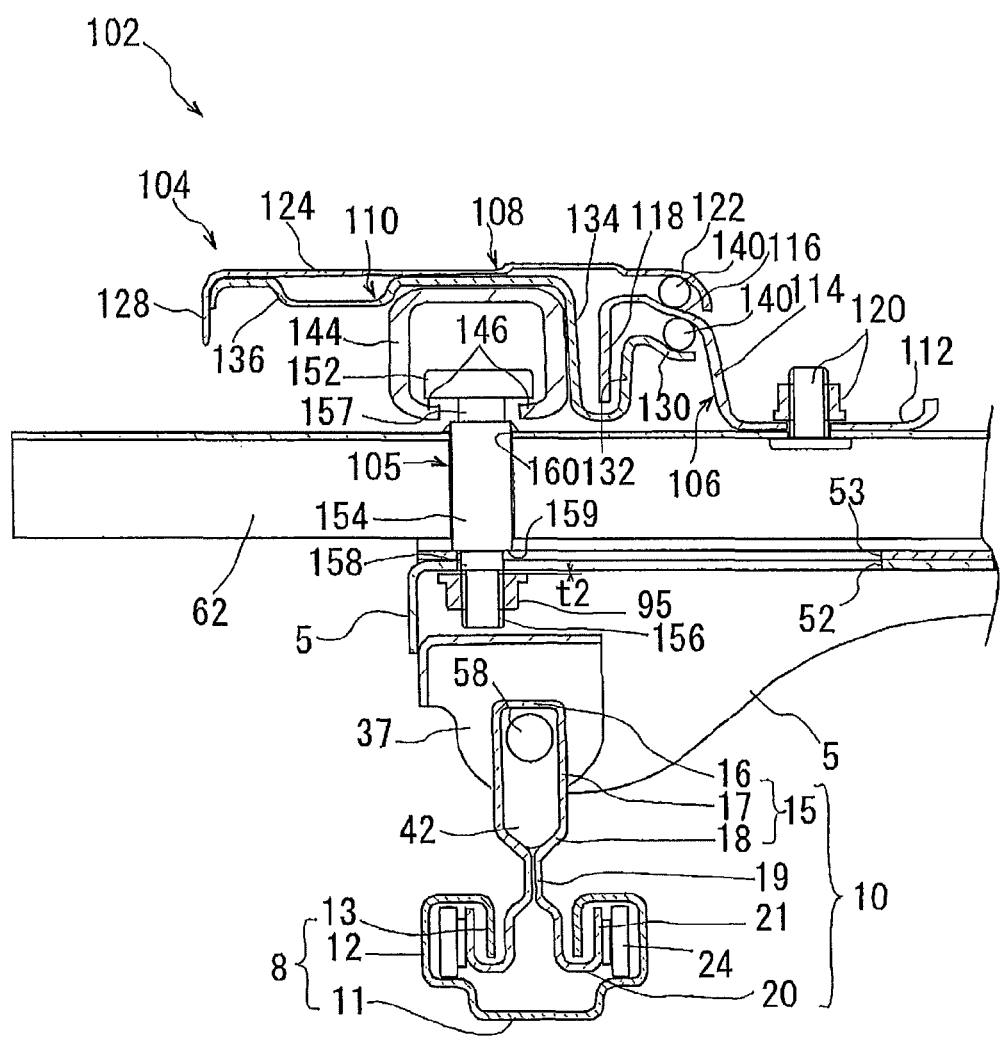
FIG. 10 is a cross-sectional view of a portion of a back face of a left side of the seat apparatus according to the second embodiment.

The rotary plate lower rail 106 is formed by a ring-shaped thin plate member. As illustrated in FIG. 10, a bottom wall portion 112 is formed at an inner circumferential side of the ring-shape of the rotary plate lower rail 106. The bottom wall portion 112 is fixed to the second upper rails 62 of the width-directional sliding mechanisms 6 with a fixing member 120. A sidewall portion 114 is formed at an outer peripheral edge of the bottom wall portion 112 so as to protrude obliquely upwardly therefrom. A ceiling portion 116 is formed at an outer peripheral side of the bottom wall portion 114 so as to be bent and tilted slightly upwardly from an upper end of the sidewall portion 114. A flange wall portion 118 is formed at an outer peripheral side of the ceiling portion 116 so as to be bent downwardly from an upper end of the ceiling portion 116.

The first rotary plate upper rail 108 is formed by a ring-shaped thin plate member. A first slide wall portion 122 is formed at an inner circumferential side of the first rotary plate upper rail 108. The first slide wall portion 122 faces an upper surface of the ceiling portion 116 of the rotary plate lower rail 106 and includes an inner end portion slanting downwardly. A ceiling portion 124 is formed at an outer circumferential side of the first slide wall portion 122 so as to extend horizontally.

Fixing members are inserted in fixing holes 126 (see FIG. 8), thereby fixing the ceiling portion 124 to the seat frame 64 (see FIG. 9). A flange wall portion 128 is formed at an outer circumferential portion of the ceiling portion 124 so as to be bent downward from an outer end of the ceiling portion 124.

The second rotary plate upper rail 110 is formed by a ring-shaped thin plate member. A second slide wall portion 130 is formed at an inner circumferential side of the second rotary plate upper rail 110. The second slide wall portion 130 faces a lower surface of the ceiling portion 116 of the rotary plate lower rail 106 and includes an inner end portion slanting downwardly. An inner wall portion 132 is formed at an outer circumferential side of the second slide wall portion 130 to be bent downwardly from an outer end of the second slide wall portion 130. An outer wall portion 134 is formed so as to face the inner wall portion 132 in a predetermined distance from the inner wall portion 132 and to extend upwardly from an outer end of the inner wall portion 132. A ceiling portion 136 is formed at an outer circumferential side of the outer wall portion 134 so as to extend horizontally therefrom. The ceiling portion 136 faces a lower surface of the ceiling portion 124 of the first rotary plate upper rail 108. The ceiling portion 136 of the second rotary plate upper rail 110 is fixed to the ceiling portion 124 of the first rotary plate upper rail 108 with a fixing member.

Rolling members 140 are arranged between the upper surface of the ceiling portion 116 of the rotary plate lower rail 106 and the first slide wall portion 122 of the first rotary plate upper rail 108 and between the lower surface of the ceiling portion 116 of the rotary plate lower rail 106 and the second slide wall portion 130 of the second rotary plate upper rail 110, thereby smoothly rotating the first and second rotary plate upper rails 108 and 110 relative to the rotary plate lower rail 106. In addition, the rotation of the first and second rotary plate upper rails 108 and 110 relative to the rotary plate lower rail 106 is restricted within 180 degrees by a stopper device arranged at the rotary plate lower rail 106. A lock-unlock mechanism operated by a lock lever 142 (see FIGS. 8 and 9) allows the rotation of the first and second rotary plate upper rails 108 and 110 relative to the rotary plate lower rail 106 and stops the first and second rotary plate upper rails 108 and 110 at a desired position within a relatively rotatable range.

As shown in FIG. 8 and FIG. 10, a pair of hook members 144 is fixed to a lower surface of a rear side of the second rotary plate upper rail 110 with fastening members. Each of the hook members 144 forms a circular arc shape and has a predetermined length along a rotating circular arc thereof. The hook member 144 has a lower opening while being configured to have an approximately U-shaped cross-section. Engagement pawls 146 facing each other are formed along side edges of the opening. The hook members 144 are respectively arranged at positions so as to engage with the load transmitting pins 105 arranged at a rear side of the seat apparatus 102. The load transmitting pins 105 will be described below.

Figure 11:
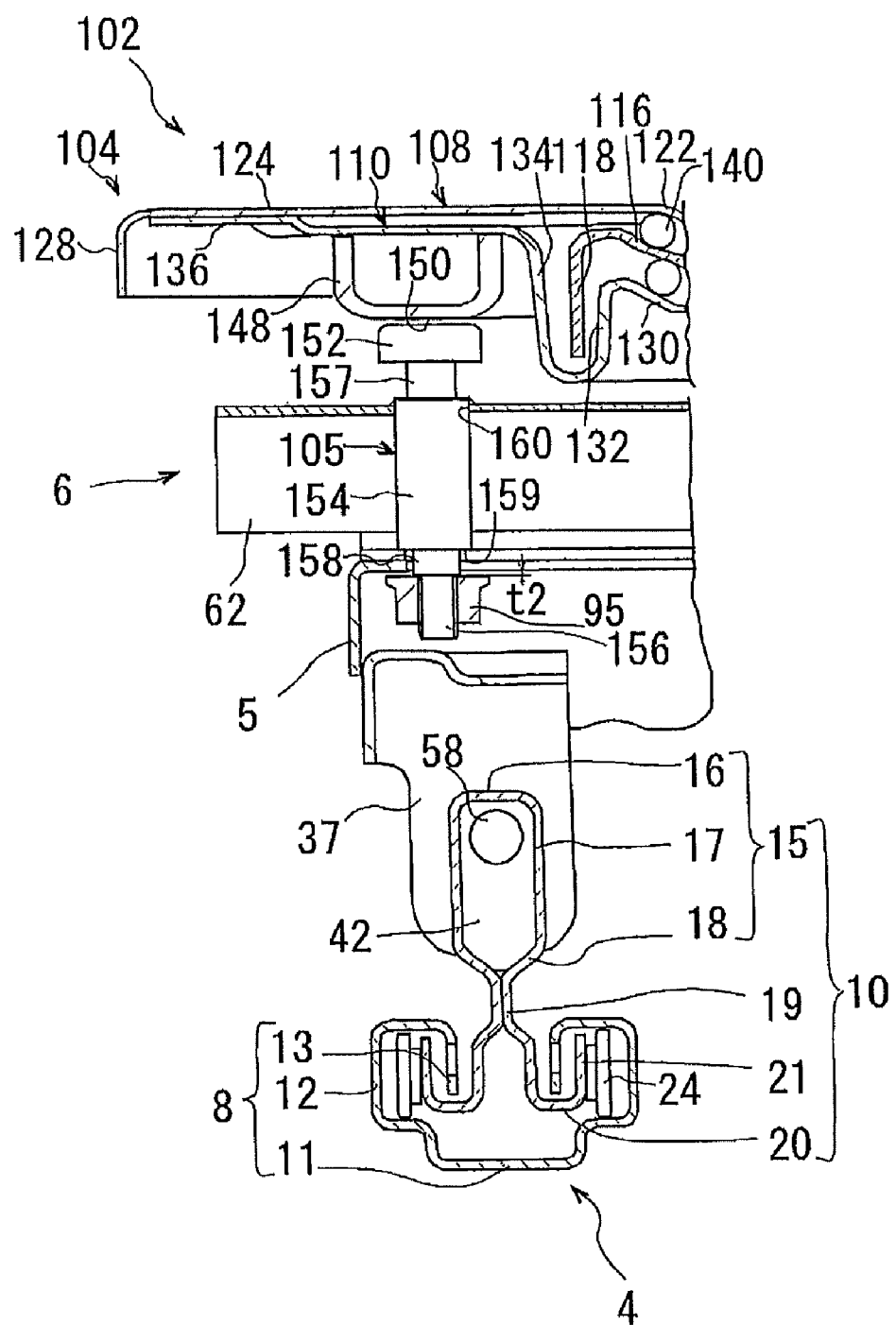
FIG. 11 is a cross-sectional view of a portion of a back face of a right side of the seat apparatus according to the second embodiment.

As illustrated in FIG. 8 and FIG. 11, a pair of contact plate members 148 is fixed to a lower surface of a front side of the second rotary plate upper rail 100 with fastening members. Each of the contact plate members 148 forms a circular arc shape and has a predetermined length along a rotating circular arc thereof. The contact plate member 148 has a bottom wall portion 150 at the lower portion while being configured so as to have an approximately U-shaped cross-section. The contact plate members 148 are respectively arranged at positions so as to face the load transmitting pins 105 arranged at a front side of the seat apparatus 102. The load transmitting pins 105 will be described below.

Each of the load transmitting pins 105 according to the second embodiment includes a pin head portion 152 formed in a flat column shape having an external diameter that is larger than a distance between the oppositely-facing engagement pawls 146 of the hook member 148, an upper shaft portion 154, and a lower externally threaded portion 156. Further, an underhead fillet portion 157 is arranged between the pin head portion 152 and the upper shaft portion 154. The underhead fillet portion 157 has an external diameter smaller than the distance between the oppositely-facing engagement pawls 146 of the hook member 148. As shown in FIG. 10, when the rear side of the second rotary plate upper rail 110 is rotated, the pin head portion 152 of the load transmitting pin 105 engages with the hook member 144. A lower shaft portion 158 is formed between the upper shaft portion 154 and the lower externally threaded portion 156. The lower shaft portion 158 has an external diameter smaller than an external diameter of the upper shaft portion 154 and larger than an external diameter of the lower externally threaded portion 156. Furthermore, a stepped section 159 is formed between the upper shaft portion 154 and the lower shaft portion 158. Fixing holes 160 are formed in the upper wall portion 72 of the second upper rail 62. The upper shaft portion 154 penetrates into each of the fixing holes 160. The upper shaft portion 154 is welded to the fixing hole 160 so as to be fixed thereto (see FIGS. 10 and 11). Moreover, the external diameter of the upper shaft portion 154 is set to be larger than the width of the enlarged hole 52 of the second lower rail 60 and the width of the enlarged hole 53 of the attachment bracket 52. The external diameter of the lower shaft portion 158 is set to be slightly smaller than the width of the elongated holes 52 and 53 so as to penetrate therethrough and have the small clearance t1 (see FIG. 4) relative to the elongated holes 52 and 53. Additionally, an axial length of the lower shaft portion 158 is set to be slightly larger than the total length of the thickness of the upper wall portion 50 of the attachment bracket 5 and the thickness of the bottom wall portion 66 of the second lower rail 60. Accordingly, when the flanged nut 95 is screwed with the lower externally threaded portion 156 so as to be fastened thereto, the small clearance t2 is defined between the lower surface of the upper wall portion 50 of the attachment bracket 5 and the flanged nut 95. The external diameter of the flanged nut 95 is set to be larger than the width of the elongated holes 52 and 53.

In addition, as shown in FIG. 8 and FIG. 11, the load transmitting pin 105 is configured so that an upper surface of the pin head portion 152 faces a lower surface of the bottom wall portion 150 of the contact plate member 148 at the lower surface of the front side of the second rotary plate upper rail 110. Other configurations of the second embodiment are similar to those of the first embodiment. Accordingly, for the similar configurations of the second embodiment to those of the first embodiment, their explanations will be omitted and the same numbers as the first embodiment are used in the second embodiment.

An operation of the seat apparatus 102 according to the second embodiment will be explained as follows. The seat belt 9 is attached to the seat back frame and the seat bottom frame in the seat apparatus 102 of the second embodiment. Accordingly, in the same way as the first embodiment, a detaching load acts on the rear side (to the right in FIG. 9) of the seat apparatus 102 while a compressive load acts on the front side (to the left in FIG. 9) of the seat apparatus 102 in case of a front collision of the vehicle. When the detaching load acts on the rear side of the seat apparatus 102, an upward detaching load transmitted from the seat frame 64 via the fixing members is applied to the first and second rotary plate upper rails 108 and 100 and the rotary plate lower rail 106. At this time, each of the hook members 144 fixed to the lower surface of the second rotary plate upper rail 110 is moved upwardly and the engagement pawls 146 of the hook member 144 engage with the pin head portion 152 of the load transmitting pin 105. Consequently, the load transmitting pin 105 is pulled upwardly (see FIG. 10). Although the load transmitting pin 105 is fixed to the second upper rail 62, the second upper rail is deformed by the upward load and thereby allows the small clearance t2 between the attachment bracket 5 and the flanged nut 95 to be closed. Consequently, the flanged nut 95 makes contact with a lower surface of the attachment bracket 5. As a result, the upward load is transmitted to the attachment bracket 5 and thereby is partially received by the attachment bracket 5. Thus, the detaching load acting between the first and second rotary plate upper rails 108 and 110 and the rotary plate lower rail 106 is reduced. Further, similarly to the case of the first embodiment, the detaching load between the second upper rail 62 and the second lower rail 60 is received by the attachment bracket 5 via the load transmitting pins 105 and thus divided by the second upper rail 62, the second lower rail 60, and the attachment bracket 5. Furthermore, similarly to the case of the first embodiment, the engagement portions 36a and 36b of the attachment bracket 5 are attached to the accommodating portions 15a of the first upper rails 10 via the fixing bolts 58 while establishing the both-end supporting mechanism. Accordingly, the upward load from the center of the width direction of the attachment bracket 5 is divided by the engagement portions 36a and 36b into a shearing force mainly applied to the fastening bolts 58. Moreover, the fastening bolt 58 is screwed with the nut member 42 fixed within the accommodating portion 15 of the first upper rail 10. Accordingly, the upward load is received by the first upper rails 10 arranged adjacent to the floor 3 and released to the floor 3 without the occurrence of a stress concentration caused by the upward load.

In a case where a compressive load acts on the front side of the seat apparatus 102, a downward compressive load from the seat frame 64 is applied to the first and second rotary plate upper rails 108 and 110. At this time, each of the contact plate members 148 fixed to the lower surface of the second rotary plate upper rail 110 is moved downwardly and the lower surface of the bottom wall portion 150 of the contact plate member 148 makes contact with the upper surface of the pin head portion 152 of the load transmitting pin 105 (see FIG. 11). The load transmitting pin 105 is pushed downwardly by the contact between the contact plate member 148 and the load transmitting pin 105. Although the load transmitting pin 105 is fixed to the second upper rail 62, the second upper rail 62 is deformed by the compressive load and therefore allows the stepped section 159 between the upper shaft portion 154 and the lower shaft portion 156 to press an upper surface of the bottom wall portion 66 of the second lower rail 60 and an upper surface of the attachment bracket 5. Accordingly, the downwardly compressive load is transmitted to the attachment bracket and partially shared thereby. Thus, the compressive load between the first and second rotary upper rails 108 and 110 and the rotary plate lower rail 106 is reduced. Further, similarly to the case of the first embodiment, the compressive load between the second upper rail 62 and the second lower rail 60 is partially received by the attachment bracket 5 via the load transmitting pins 105. Accordingly, the compressive load from the second upper rail 62 is divided, therefore increasing the mechanical strength of the seat apparatus 102 to thereby increase the safety thereof. Furthermore, similarly to the case of the first embodiment, the compressive load is received by the both-end supporting mechanism of the engagement portions 36a and 36b of the attachment bracket 5 and received by the first upper rails 10 arranged adjacent to the floor 3, thereby being released to the floor 3.

Additionally, according to the first and second embodiments, one of the engagement portions 36a and 36b is set to conform to the opening end of the accommodating portion 15 and the other of the engagement portions 36a and 36b is inserted in a single slit 30 formed in the accommodating portion 15. Afterwards, the fastening bolt 58 is inserted into the respective engagement holes 34 of the engagement portions 36a and 36b, thereby connecting the attachment bracket 5 to the first upper rails 10. Alternatively, for example, two slits may be formed at an end of a first upper rail so as to conform to a pair of engagement portions arranged at one of side ends of an attachment bracket. Then, the engagement portions of the attachment bracket are respectively inserted in the slits and a connecting member is inserted into engagement holes of the engagement portions so as to penetrate through the engagement holes within an accommodating portion of the first upper rail.

Moreover, according to the first and second embodiments, the load transmitting pin 84 serves as the load transmitting member; however, the load transmitting member may be a rod member, the length of which is long. In addition, the width of the elongated hole 53 of the second lower rail 60 is set to be smaller than the external diameter of the upper shaft portion 86 of the load transmitting pin 84 but may be larger than the external diameter of the upper shaft portion 86. In such case, when a downward compressive load acts on the load transmitting pin 84, the stepped section 91 of the lower end of the upper shaft portion 86 makes contact with an upper peripheral edge surface of the elongated hole 52 of the attachment bracket 5. Accordingly, the downward compressive load is received by the attachment bracket 5.

Furthermore, according to the first and second embodiments, the attachment bracket 5 is formed by the elongated member having the approximately U-shaped cross-section; alternatively, the attachment bracket 5 may be formed by an elongated member having a rectangular cross-section. Additionally, the fastening bolt 58 is applied to the connecting member in the first and second embodiments; alternatively, the connecting member may be a shaft member having a hexagonal cross-section.

The configurations of the seat apparatus 2, 102 described in the aforementioned first and second embodiments are only examples but may be applicable to other various embodiments as long as such various embodiments do not depart from the principles of the first and second embodiments.

The seat apparatus 2, 102 described in the aforementioned first and second embodiments may be applied to a seat for a vehicle, which includes longitudinal and width-directional sliding mechanisms.

Figure 12:
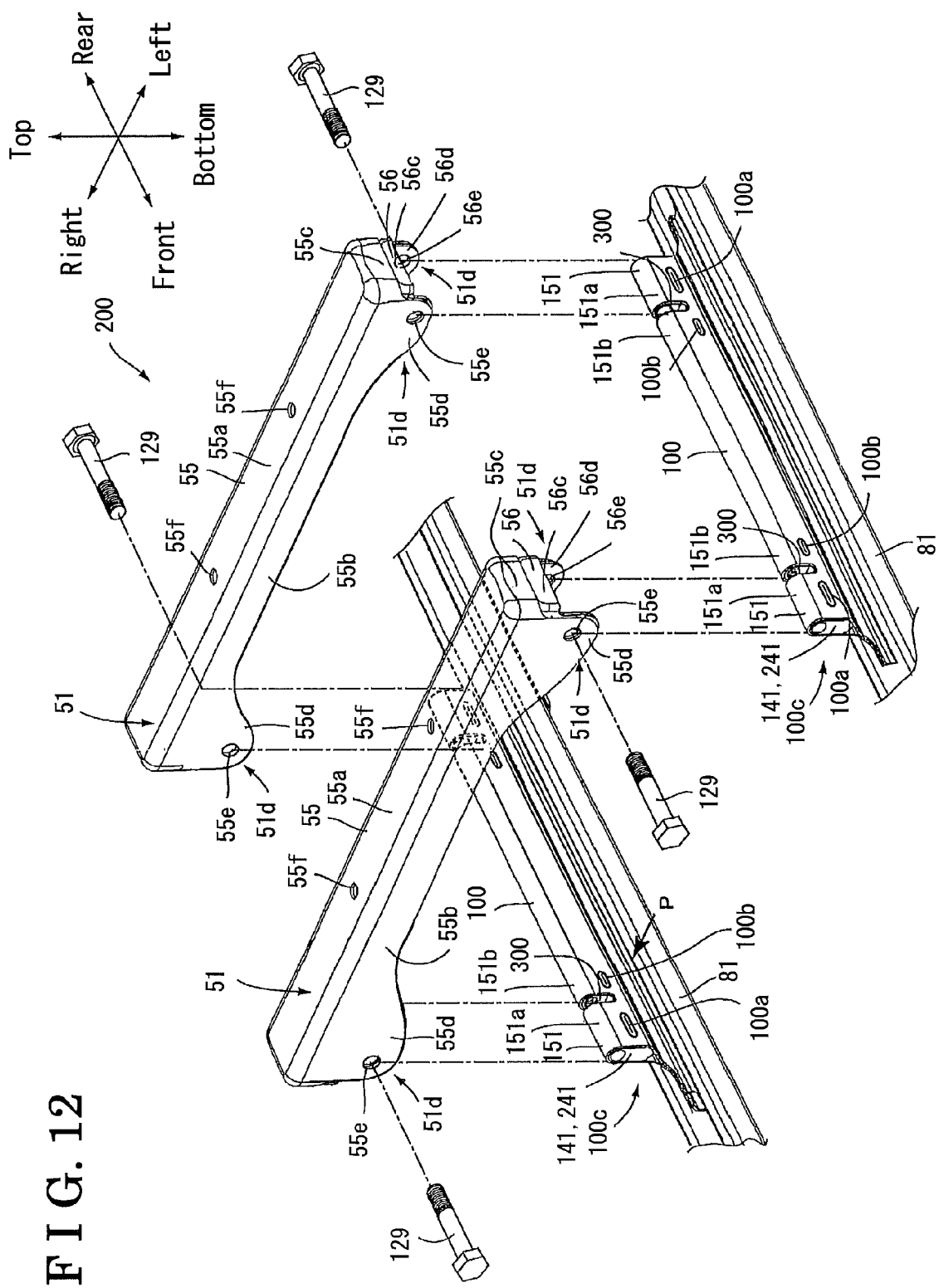
FIG. 12 is an exploded perspective view of a seat apparatus for a vehicle according to third and fourth embodiments disclosed here.

Third and fourth embodiments disclosed here will be explained with reference to FIGS. 12 to 19. In the embodiments, directions and orientations such as left, right, front, rear, top, and bottom correspond to those when viewed from a passenger seated on a seat for a vehicle as illustrated in FIG. 12.

A seat apparatus for a vehicle (seat apparatus) 200 supports a seat member for a vehicle at an upper side so that the seat member is slidable in a longitudinal direction of the vehicle. As illustrated in FIG. 12, the seat apparatus 200 includes a pair of lower rails, i.e., left and right lower rails 81 each serving as a first lower rail that are fixed to a vehicle floor and that extend in the longitudinal direction of the vehicle, and a pair of upper rails, i.e., left and right upper rails 100 each serving as a first upper rail and movably supported onto the left and right lower rails 81, respectively. Then, a pair of attachment brackets, i.e., front and rear attachment brackets 51, is arranged in parallel to each other between the left and right upper rails 100. Specifically, the front and rear attachment brackets 51 are vertically disposed between the seat member and the left and right upper rails 100 to support the seat member and to connect the seat member to the left and right upper rails 100.

Figure 17:
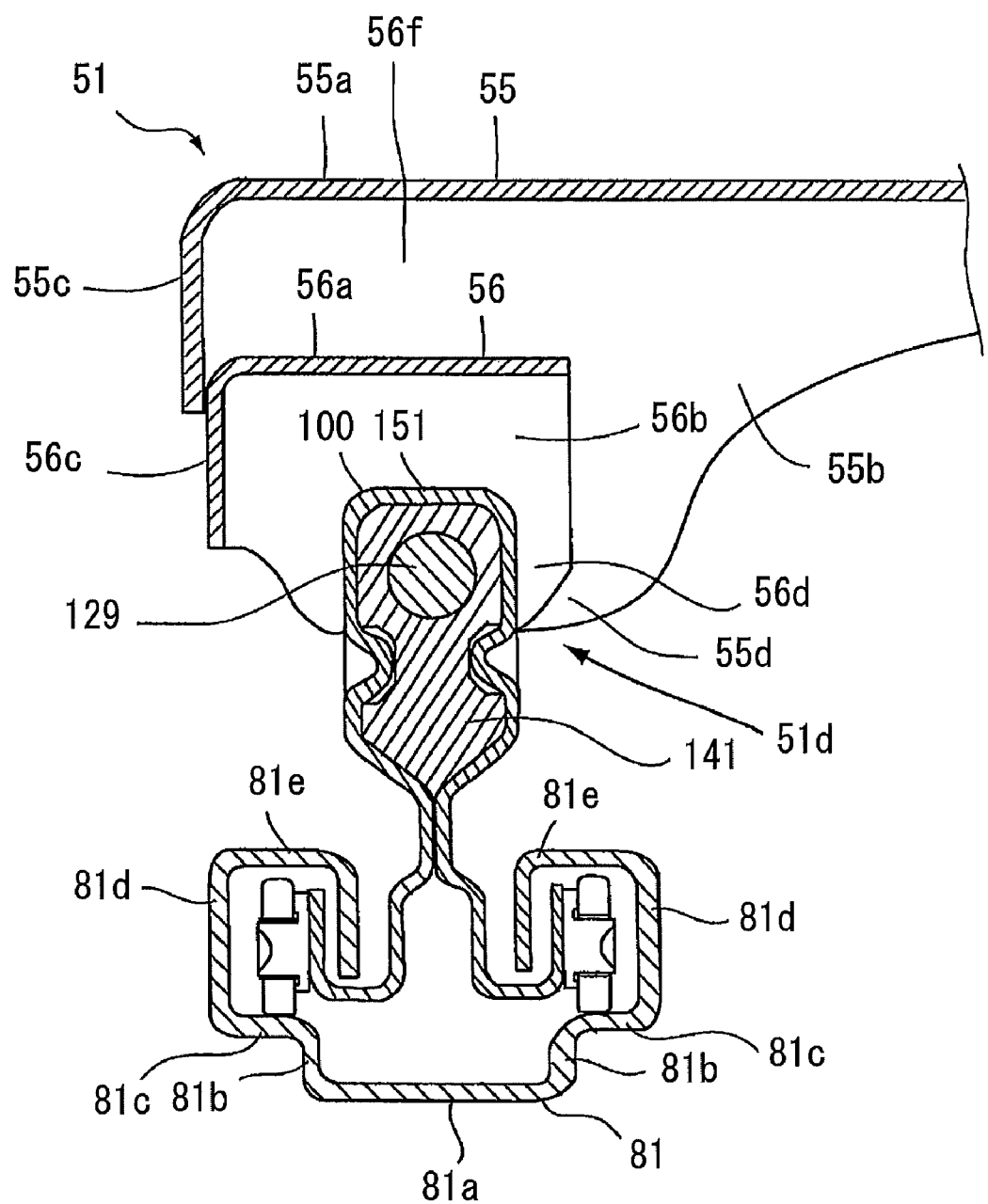
FIG. 17 is a cross-sectional view taken along line XVII-XVII in FIG. 16 according to the third embodiment.

As illustrated in FIG. 17, each of the left and right lower rails 81 includes a bottom wall portion 81a, a pair of first sidewall portions 81b, a pair of horizontal wall portions 81c, a pair of second sidewall portions 81d, and a pair of flange wall portions 81e. The first sidewall portions 81b extend upwardly from respective ends of the bottom wall portion 81a. The horizontal wall portions 81c bend outwardly at a right angle from the first sidewall portions 81b, respectively. A front roller 121 and a rear roller 123, which will be explained later, provided at each of the upper rails 100 are placed in a rolling manner on each of the horizontal wall portions 81c. The second sidewall portions 81d extend upwardly from respective ends of the horizontal wall portions 81c. The flange wall portions 81e bend inwardly from respective upper ends of the second sidewall portions 81d and then extend downwardly. Each of the left and right lower rails 81 is fixed to the vehicle floor via brackets provided at front and rear portions of a lower surface of the bottom wall portion 81a, each of the brackets being fixed to the vehicle floor by means of a bolt, and the like.

Figure 14:
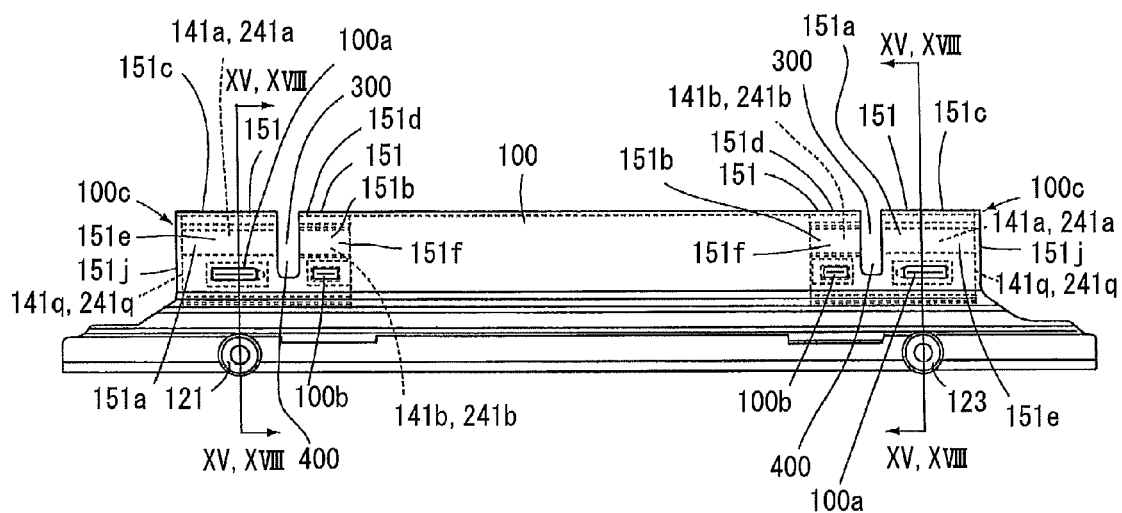
FIG. 14 is a side view of an upper rail of the seat apparatus according to the third and fourth embodiments.
Figure 15:
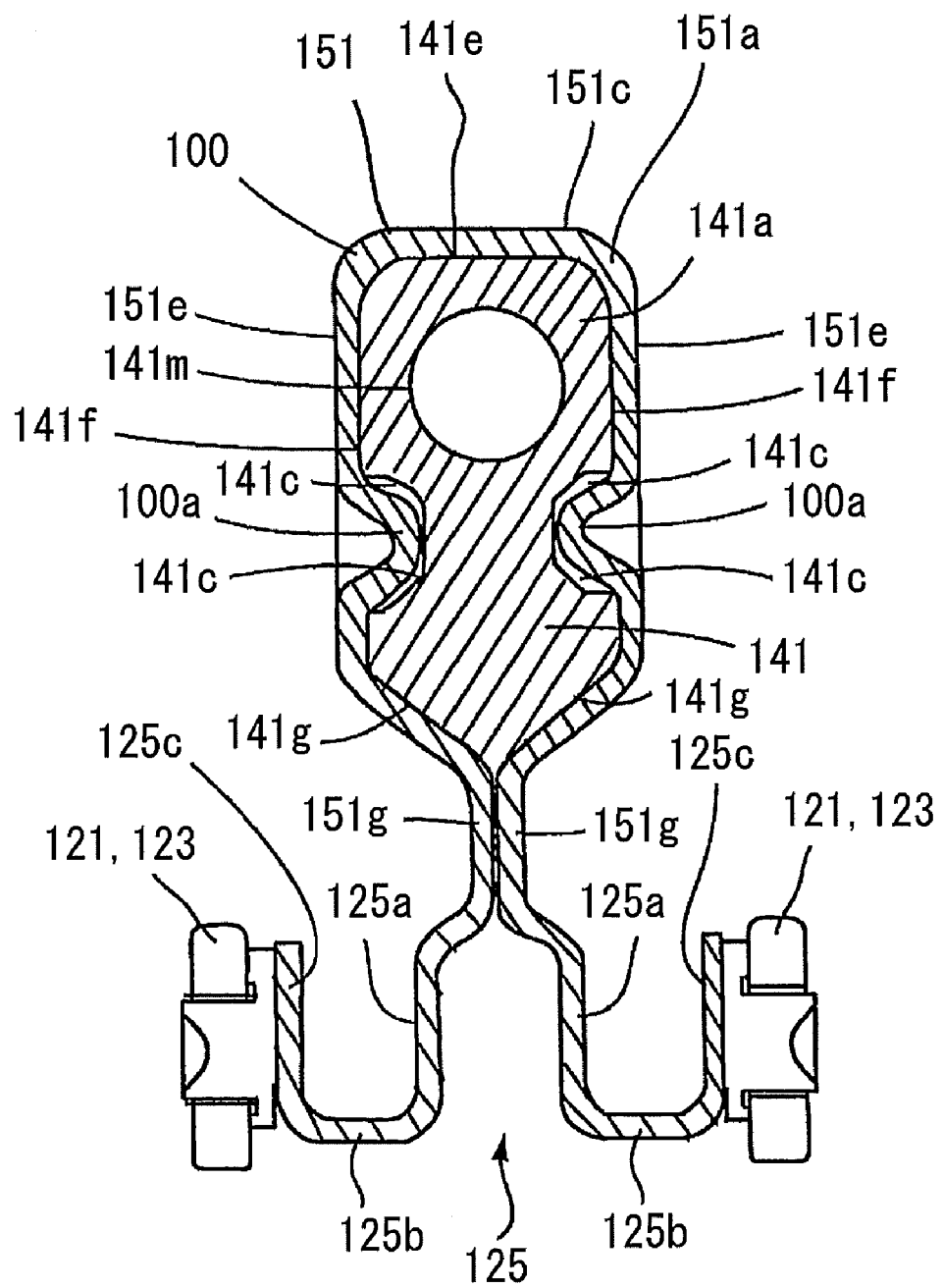
FIG. 15 is a cross-sectional view taken along line XV-XV in FIG. 14 according to the first embodiment.

As illustrated in FIGS. 14 and 15, each of the upper rails 100 includes pouch-shaped accommodating portions 151 at upper sides of both end portions 100c in the longitudinal direction. Each of the accommodating portions 151 accommodates a nut member 141, which will be explained later, connected to each of the attachment brackets 51. The upper rail 100 also includes leg portions 125. Each of the leg portions 125 supports the front roller 121 and the rear roller 123 both of which are provided so that the upper rails 100 are movable on the respective lower rails 81 in the longitudinal direction of the vehicle.

Each of the accommodating portions 151 is divided into a first accommodating portion 151a and a second accommodating portion 151b by means of a first slit 300 formed at a portion in the longitudinal direction of the accommodating portion 151 and having a predetermined width. The first accommodating portion 151a is positioned close to either of the end portions 100c of the upper rail 100. The second accommodating portion 151b is positioned close to a center of the upper rail 100. The first accommodating portion 151a and the second accommodating portion 152a are each formed into a pouch shape. As illustrated in FIG. 15, the first accommodating portion 151a includes an upper wall portion 151c, a pair of sidewall portions 151e serving as side surfaces, and a pair of vertical walls 151g. The pair of sidewall portions 151e, facing each other, extends downwardly from respective ends of the upper wall portion 151c. The pair of vertical walls 151g bends from lower ends of the sidewall portions 151e obliquely downward in an inward direction and thereafter extends downwardly as a unit. In the same manner, the second accommodating portion 151b includes an upper wall portion 151d, a pair of sidewall portions 151f serving as side surfaces, and the pair of vertical walls 151g. The pair of sidewall portions 151f, facing each other, extends downwardly from respective ends of the upper wall portion 151d. The pair of vertical walls 151g bends from lower ends of the sidewall portions 151f obliquely downward in an inward direction and thereafter extends downwardly as a unit.

Each of the leg portions 125 includes a pair of vertical walls 125a that bends obliquely downward in an outer direction from respective lower ends of the vertical walls 151g of the first accommodating portion 151a and the second accommodation portion 151b and that then extends downwardly. The leg portion 125 also includes a pair of bottom wall portions 125b bending from respective lower ends of the vertical walls 125a in the outward direction at a right angle. The leg portion 125 further includes a pair of flange wall portions 125c that extends upwardly from respective ends of the bottom wall portions 125b. The front roller 121 is supported at a front portion of each of the flange wall portions 125c in a rolling manner while the rear roller 123 is supported at a rear portion of each of the flange wall portions 125c in a rolling manner.

Figure 13:
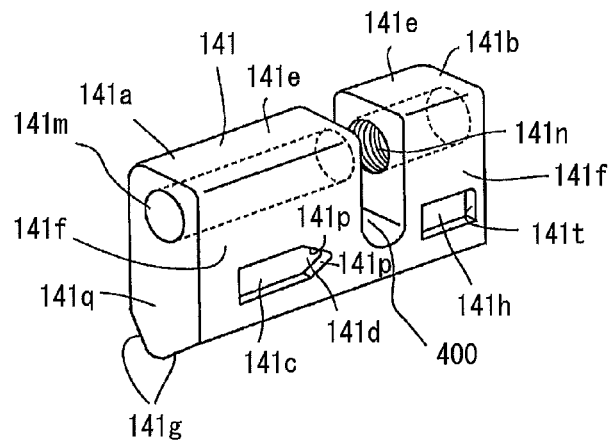
FIG. 13 is a perspective view of a nut member of the seat apparatus according to the third embodiment.

Each of the nut members 141 is made of metal such as iron having a relatively high tensile strength. As illustrated in FIG. 13, an upper portion of each of the nut members 141 is divided into a through-hole portion 141a and an internally threaded portion 141b by mean of a second slit 400 formed at a portion in the longitudinal direction of the nut member 141 and having a predetermined width substantially similar to the width of the first slit 300. The internally threaded portion 141b is formed by an internal thread 141n. As illustrated in FIGS. 12, 14, and 15, the first accommodating portion 151a of the accommodating portion 151 accommodates the through-hole portion 141a while the second accommodating portion 151b of the accommodating portion 151 accommodates the internally threaded portion 141b. At this time, positions of the first slit 300 and the second slit 400 substantially match each other.

As illustrated in FIGS. 13 and 15, each of the through-hole portions 141a and the internally threaded portions 141b includes an upper surface 141e, a pair of side surfaces 141f, and a pair of tapered surfaces 141g. The upper surfaces 141e of the through-hole portion 141a and the internally threaded portion 141b that constitute each of the nut members 141 have the same heights as each other. The side surfaces 141f extend downwardly from respective ends of the upper surface 141e. The tapered surfaces 141g extend from respective lower ends of the side surfaces 141f at an angle in an inner direction so as to form an inverse triangle shape. Then, groove portions 141c, each having a predetermined groove depth, are formed at lower portions of the respective side surfaces 141f of each of the through-hole portions 141a. Each of the groove portions 141c extends in the same direction as a screwing direction of the internal thread 141n formed at each of the internally threaded portions 141b and includes a tapered groove portion 141d at an end that is gradually narrower towards a center of the upper rail 100. In addition, groove portions 141h, each having a predetermined groove depth, are formed at lower portions of the respective side surfaces 141f of each of the internally threaded portions 141b. Each of the groove portions 141h extends in the same direction as the groove portion 141c but does not include a tapered groove portion at an end.

Each of the nut members 141 is formed into a predetermined shape substantially the same as internal shapes of the first accommodating portion 151a and the second accommodating portion 151b so that looseness is restrained when the nut member 141 is accommodated in the first and second accommodating portions 151a and 151b. In a state where the nut member 141 is accommodated in the first accommodating portion 151a and the second accommodating portion 151b, the sidewall portions 151e of the first accommodating portion 151a are partially deformed towards the respective groove portions 141c so as to form deformation portions 100a. In the same manner, the sidewall portions 151f of the second accommodating portion 151b are partially deformed towards the respective groove portions 141h so as to form deformation portions 100b. The deformation portions 100a are inserted into the groove portions 141c, i.e., the tapered groove portions 141d formed at the respective ends of the groove portions 141c. The deformation portions 100b are inserted into the groove portions 141h, respectively. At this time, as illustrated by a dashed line in FIG. 14 and a chain double-dashed line in FIG. 16, an end surface 141q of each of the nut members 141 is positioned away from an end surface 151j of each of the end portions 100c by a predetermined distance towards the center of the upper rail 100.

Figure 16:
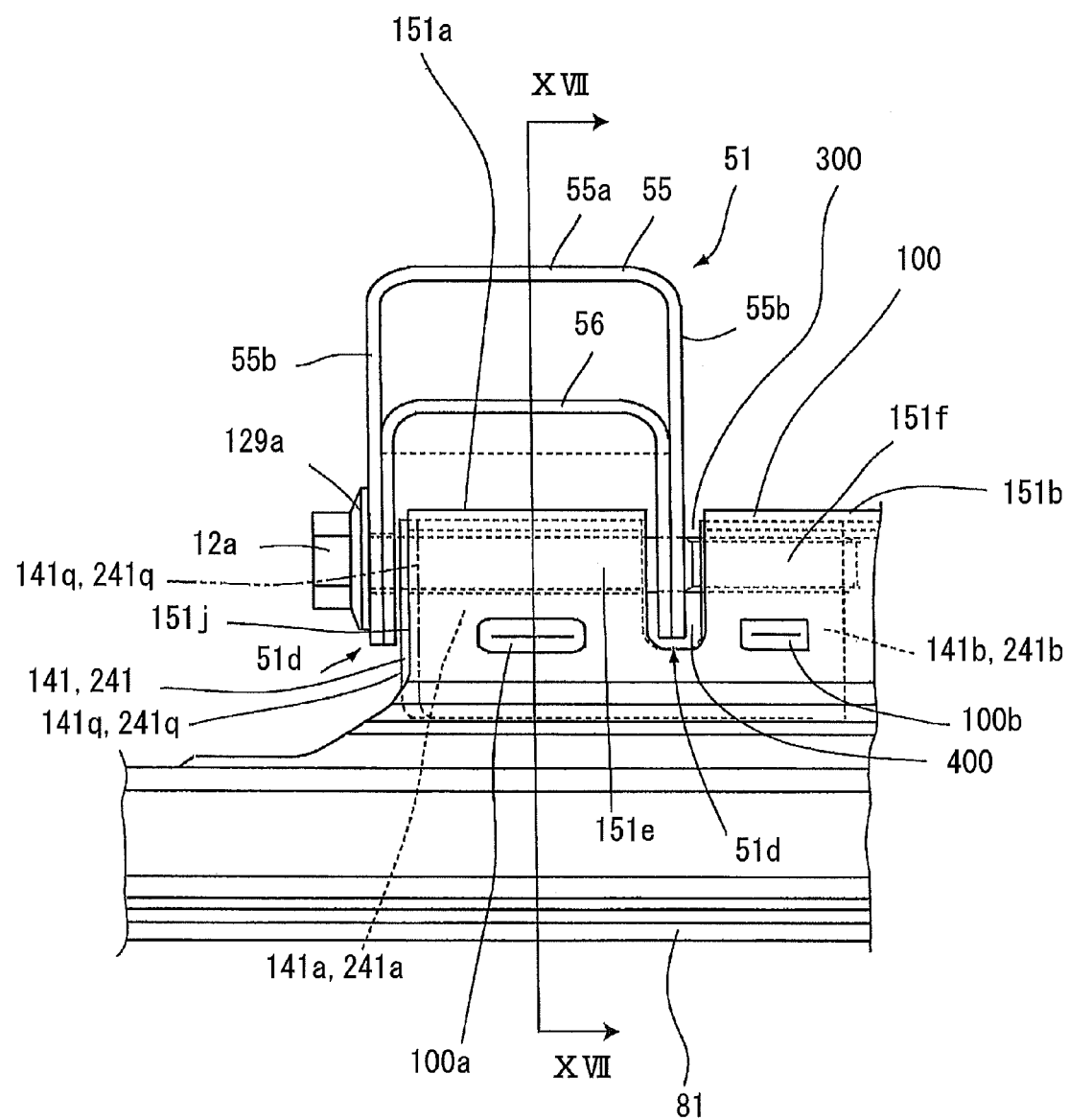
FIG. 16 is an enlarged view of the seat apparatus viewed from an arrow P in FIG. 12 according to the third and fourth embodiments.

As illustrated in FIGS. 12, 16 and 17, each of the attachment brackets 51 includes a bracket 55 and a pair of reinforcing members 56, which reinforces the bracket 55, welded and fixed to one another. Each of the brackets 55 includes an upper wall portion 55a, a pair of flange walls 55b, and a pair of sidewall portions 55c. The upper wall portion 55a supports the seat member. The pair of flange walls 55b extends downward from respective front and rear ends of the upper wall portion 55a. The pair of sidewall portions 55c extends downward from respective left and right ends of the upper wall portion 55a for improving reinforcement. Two bolt attachment holes 55f connected to the seat member are formed at left and right portions, respectively, of the upper wall portion 55a. Each of the flange walls 55b includes flange-shaped engagement portions 55d and bolt attachment bores 55e at lower left and right end portions so as to be connected to the nut members 141 accommodated in the accommodating portions 151 formed at respective upper portions of the upper rails 100.

Each of the reinforcing members 56 includes an upper wall portion 56a, a pair of flange walls 56b that extends from respective front and rear ends of the upper wall portion 56a, and a sidewall portion 56c that extends downwardly from either left or right end of the upper wall portion 56a for improving reinforcement. In each of the flange walls 56b, an engagement portion 56d and a bolt attachment bore 56e are formed at either left or right lower end for a connection to the nut member 141 accommodated in the accommodating portion 151 formed at the upper portion of the upper rail 100.

Each of the reinforcing members 56 is inserted into an inner side of each of the brackets 55 from a lower side thereof in a state where the upper wall portion 56a is positioned upwardly. At this time, the reinforcing member 56 is inserted into the bracket 55 while an inner surface of the sidewall portion 55c of the bracket 55 is in contact with an outer surface of the sidewall portion 56c of the reinforcing member 56. Then, the bracket 55 and the reinforcing member 56 are welded and fixed to each other at a position where the bolt attachment bore 55e of the engagement portion 55d formed at the flange wall 55b of the bracket 55 and the bolt attachment bore 56e of the engagement portion 56d formed at the flange wall 56b of the reinforcing member 56 match each other. The engagement portion 55d of the bracket 55 and the engagement portion 56d of the reinforcing member 56, both fixed to each other, form an engagement portion 51d. That is, a pair of engagement portions 51d serving as first and second engagement portions is provided at each of the left and right end portions of the attachment bracket 51. In addition, a void 56f is formed between each of the upper wall portions 55a of the bracket 55 and each of the upper wall portions 56a of the reinforcing member 56.

Next, a connection between the attachment brackets 51 and the upper rails 100 according to the third embodiment having the aforementioned structure will be explained below. In the seat apparatus 200 of the present embodiment, the attachment brackets 51 are mounted onto the upper rails 100 in a state where the attachment brackets 51 are fixed to the seat member via bolts beforehand.

Either one of the attachment brackets 51 in parallel with each other in the longitudinal direction of the vehicle may be first assembled on the upper rails 100. In this case, the pairs of engagement portions 51d provided at both the left and right end portions of one of the attachment brackets 51 are completely assembled on the respective upper rails 100 before the other one of the attachment brackets 51 is assembled on the upper rails 100. In the following, for an easy explanation, one of the attachment brackets 51 first assembled on the upper rails 100 is described as the first attachment bracket 51 and the other one of the attachment brackets 51 assembled after the first attachment bracket 51 is assembled on the upper rails 100 is described as the second attachment bracket 51.

The first attachment bracket 51 is arranged in such a manner that the first accommodating portion 151a of one of the accommodating portions 151 of the upper rail 100 is disposed between the pair of engagement portions 51d formed at one of the left and right end portions of the first attachment bracket 51. At this time, the end surface 151j of the end portion 100c of the upper rail 100 is arranged to be in contact with one of the engagement portions 51d. Afterwards, a bolt 129 serving as a connecting member is externally inserted along the longitudinal direction of the upper rail 100 into the end portion 100c of the upper rail 100 and the engagement portion 51d of the first attachment bracket 51. That is, the bolt 129 penetrates through the bolt attachment bores 55e and 56e of one of the engagement portions 51d, and a through-hole 141m formed at the through-hole portion 141a accommodated in the first accommodating portion 151a. The bolt 129 further penetrates through the bolt attachment bores 56e and 55e of the other one of the engagement portions 51d positioned in the first slit 300 so as to be meshed with the internal thread 141n of the internally threaded portion 141b accommodated in the second accommodating portion 151b. At this time, the deformation portions 100a, which are inserted into the respective tapered groove portions 141d formed at both the side surfaces 141f of the nut member 141, are positioned close to tapered surfaces 141p formed at the tapered groove portions 141d. As a result, a clearance becomes small between each of the deformation portions 100a and each of the tapered surfaces 141p. The deformation portions 100a are supported to be slightly movable in the vertical direction and in a direction towards the end surface 151j of the end portion 100c of the upper rail 100.

When the bolt 129 is further screwed and tightened, the bolt 129 is meshed with the internal thread 141n and is moved in the tightening direction. However, as illustrated in FIG. 16, a movement of the bolt 129 is restricted at a point when a head portion 129a of the bolt 129 makes contact with one of the engagement portions 51d of the first attachment bracket 51. The nut member 141 is then pulled by a screwing action of the bolt 129 to move towards the end surface 151j of the end portion 100c of the upper rail 100. While the nut member 141 is still moving, the deformation portions 100a of both the sidewall portions 151e of the upper rail 100 are wedged into the respective tapered surfaces 141p by means of a wedge effect. Accordingly, the nut member 141 is securely fixed in the vertical direction and is restricted to move in the longitudinal direction relative to the upper rail 100. The positioning of the nut member 141 is stably conducted and the assembly of the first attachment bracket 51 on the upper rail 100 is completed. In the aforementioned state, the end surface 141q of the nut member 141 and one of the engagement portions 51d of the first attachment bracket 51 are fixed, while being in contact with each other. In the first attachment bracket 51 of which the pair of engagement portions 51d provided at one of the left and right end portions of the attachment bracket 51 is completely assembled on the upper rail 100, the bolt 129 is externally inserted to another pair of engagement portions 51d provided at the other one of the left and right end portions not yet assembled on the upper rail 100 in the aforementioned manner.

Next, the assembly of the second attachment bracket 51 will be explained. The assembly process of the second attachment bracket 51 is the same as that of the aforementioned first attachment bracket 51. However, conditions for assembly are different, which will be described below. Although the first attachment bracket 51 is fixed to the lower surface of the seat member before being assembled on the upper rails 100, the first attachment bracket 51 is first assembled on the upper rails 100 and therefore is assembled without being influenced by the second attachment bracket 51. On the other hand, in the second attachment bracket 51, positions of the pair of engagement portions 51d provided at each of the left and right end portions of the second attachment bracket 51 are determined naturally at a time when the first attachment bracket 51 is fixed to the upper rails 100. Thus, the second attachment bracket 51 is assembled with the assumption that a clearance may be formed between the engagement portion 51d of the second attachment bracket 51 and the end surface 151j of the end portion 100c of the upper rail 100.

First, in the same way as the assembly of the first attachment bracket 51, the bolt 129 is externally inserted to the end portion 100c of one of the upper rails 100. When the bolt 129 is screwed and tightened, the nut member 141 moves towards the end surface 151j of the end portion 100c of the upper rail 100. The nut member 141 then passes the end surface 151j of the end portion 100c of the upper rail 100 and continues to move in an axially outward direction through the clearance formed between the engagement portion 51d and the end surface 151j of the end portion 100c, until the end surface 141q of the nut member 141 makes contact with the engagement portion 51d (i.e., an inner end surface thereof) or the clearance therebetween becomes small. At this time, the deformation portions 100a obtained by the sidewall portions 151e of the upper rail 100 deformed and inserted into the respective tapered groove portions 141d of the groove portions 141c that are formed on both the sidewall portions 151e of the upper rail 100 are wedged into the tapered surfaces 141p of the tapered groove portions 141d of the nut member 141 by means of a wedge effect. As a result, looseness between the upper rail 100 and the nut member 141 is absorbed, thereby restricting the movement of the nut member 141 in both the vertical direction and the longitudinal direction. The nut member 141 is therefore stably positioned. The engagement portions 51d of the attachment bracket 51 are assembled with a minimum deformation, thereby preventing a generation of an excess stress. At this time, the deformation portions 100b also engage with the respective end surfaces 141t of the groove portions 141h to thereby enhance a fixation of the nut member 141 in the longitudinal direction.

According to the third embodiment, the groove portions 141c having the tapered groove portions 141d at ends are formed at both of the side surfaces 141f of each of the through-hole portions 141a while the groove portions 141h not having the tapered groove portions are formed on both of the side surfaces 141f of each of the internally threaded portions 141b. Alternatively, the groove portions 141h not having the tapered groove portions may be formed at both of the side surfaces 141f of each of the through-hole portions 23a while the groove portions 141c having the tapered groove portions 141*d* may be formed at both of the side surfaces 141*f* of each of the internally threaded portions 141*b*. Further, the groove portions 141*c* having the tapered groove portions 141*d* may be formed at both of the side surfaces 141*f* of the through-hole portion 141*a* and at both of the side surfaces 141*f* of the internally threaded portion 141*b*. Furthermore, the groove portions 141*h* not having the tapered groove portions may not be formed. According to any structures mentioned above, the same effects are obtained.

As mentioned above, according to the third embodiment, the nut member 141 moves towards the end surface 151*j* of the end portion 100*c* of the upper rail 100 when each of the attachment brackets 51 is fixed to the upper rails 100 by means of the bolt 129 screwed to the nut member 141. Then, the deformation portions 100*a* formed at both of the side surfaces 151*e* of the accommodating portion 151 engage with the respective tapered surfaces 141*p* of the tapered groove portions 141*d* formed on both of the side surfaces 141*f* of the nut member 141, thereby fixing the nut member 141 within the accommodating portion 151 without looseness in the vertical direction and the longitudinal direction. Therefore, each of the attachment brackets 51 is stably and securely fixed to the upper rails 100 with an easy and low-cost structure. In addition, the bolt 129 is externally inserted along the longitudinal direction of the upper rail 100 to the end portion 100*c* of the upper rail 10 so as to be meshed with and tightened to the internal thread 141*n* of the nut member 141. As a result, each of the attachment brackets 51 assembled beforehand on the seat member is appropriately fixed to the upper rails 100, which leads to a reduction of assembly hours.

In addition, according to the third embodiment, the first accommodating portion 151*a* is disposed between the pair of engagement portions 51*d* formed at each of the left and right end portions of the attachment bracket 51. Then, the bolt 129 penetrates through the pair of engagement portions 51*d* of the attachment bracket 51 in addition to the through-hole 141*m* of the nut member 141 so as to be meshed with and tightened to the internal thread 141*n* of the internally threaded portion 141*b*. Then, the nut member 141 moves towards the end surface 151*j* of the end portion 100*c* of the upper rail 100 and thereafter the deformation portions 100*a* formed at both the sidewall portions (side surfaces) 151*e* of the accommodating portion 151 engage with the respective tapered surfaces 141*p* of the tapered groove portions 141*d* formed at both the side surfaces 141*f* of the nut member 141. Accordingly, the pair of engagement portions 51*d* of the attachment bracket 51 is supported at both sides of the first accommodating portion 151*a* by means of the bolt 129. Even with such simple structure for fixation, each of the attachment brackets 51 is mounted on the upper rails 100 with high rigidity in a balanced manner.

Further, according to the third embodiment, in an initial state where the deformation portions 100*a* formed at both the side surfaces of the accommodating portion 151 are inserted into the respective groove portions 141*c* formed at both the side surfaces of the nut member 141, the end surface 141*q* of the nut member 141 facing the end surface 151*j* of the end portion 100*c* of the upper rail 100 is positioned away therefrom towards the center of the upper rail 100. Thus, when the attachment bracket 51 is assembled on the upper rails 100, the pair of engagement portions 51*d* is prevented from interfering with the nut member 141. In addition, in a state where the deformation portions 100*a* engage with the respective tapered groove portions 141*d* of the groove portions 141*c* in association with the movement of the nut member 141 towards the end surface 151*j* of the end portion 100*c* of the upper rail 100 when the bolt 129 penetrating through the bolt attachment bores 55*e* and 563 formed at the attachment bracket 51 is meshed with the nut member 141, the end surface 141*q* of the nut member 141 projects in an axially outer direction from the end surface 151*j* of the end portion 100*c* of the upper rail 100. Accordingly, even when the position of the engagement portion 51*d* of the attachment bracket 51 is deviated in the longitudinal direction of the upper rail 100, the nut member 141 into which the bolt 129 is screwed moves in the longitudinal direction of the upper rail 100 so as to absorb the position deviation of the engagement portion 51*d*. As a result, the attachment bracket 51 is appropriately assembled without receiving an excess stress, which leads to an improved reliability.

A fourth embodiment will be explained with reference to FIGS. 12, 14, 16, 18, and 19. The fourth embodiment differs from the third embodiment in that groove portions 241*c* and 241*h* not having tapered groove portions are formed on both side surfaces (a pair of side surfaces) 241*f* of each nut member 241 accommodated within the accommodating portion 151 provided above the upper rail 100, and an elastic member 238 is disposed between the accommodating portion 151 and the nut member 241 in a case where the nut member 241 is accommodated within the accommodating portion 151. In the following, only differences of the fourth embodiment from the third embodiment will be explained and an explanation for substantially the same structures between the third and fourth embodiments will be omitted.

An upper portion of each of the nut members 241 is divided into a through-hole portion 241*a* and a internally threaded portion 241*b* by mean of the second slit 400 having substantially the same width as that of the first slit 300 formed at the accommodating portion 151. The first accommodating portion 151*a* of the accommodating portion 151 accommodates the through-hole portion 241*a* while the second accommodating portion 151*b* of the accommodating portion 151 accommodates the internally threaded portion 241*b*. At this time, positions of the first slit 300 and the second slit 400 substantially match each other.

As illustrated in FIGS. 12, 18 and 19, each of the through-hole portions 241*a* and the internally threaded portions 241*b* includes an upper surface 241*e*, the pair of side surfaces 241*f*, and a pair of tapered surfaces 241*g*. The upper surfaces 241*e* of the through-hole portion 241*a* and the internally threaded portion 241*b* that constitute each of the nut members 241 have the same heights as each other. The side surfaces 241*f* extend downwardly from respective ends of the upper surface 241*e*. The tapered surfaces 241*g* extend from respective lower ends of the side surfaces 241*f* at an angle in an inner direction so as to form an inverse triangle shape. Then, the groove portions 241*c*, each having a predetermined groove depth, are formed at lower portions of the respective side surfaces 241*f* of each of the through-hole portions 241*a*. Each of the groove portions 241*c* extends in the same direction as a screwing direction of an internal thread 241*n* formed at each of the internally threaded portions 241*b*. In addition, the groove portions 241*h*, each having a predetermined groove depth, are formed at lower portions of the respective side surfaces 241*f* of each of the internally threaded portions 241*b*. Each of the groove portions 241*h* extends in the same direction as the groove portion 241*c*.

The elastic member 238 is disposed between inner peripheries of the first accommodating portion 151*a* and the second accommodating portion 151*b* and outer peripheries of the through-hole portion 241*a* and the internally threaded portion 241*b*, for the purpose of restraining a looseness of the nut member 241 in the vertical direction. The elastic member 238 made of rubber, for example, covers the upper surfaces 241*e* and both of the side surfaces 241*f* of the through-hole portion 241*a* and the internally threaded portion 241*b*. Then, cut portions 239 and 240 are provided at portions of the elastic member 238 covering the side surfaces 241*f* of the through-hole portion 241*a* and the internally threaded portion 241*b* so as to expose the groove portions 241*c* and 241*h*. In a state where the nut member 241 and the elastic member 238 are accommodated within the first and second accommodating portions 151*a* and 152*b*, the sidewall portions 151*e* of the first accommodating portion 151*a* and the sidewall portions 151*f* of the second accommodating portion 151*b* are partially deformed towards the groove portions 241*c* and 241*h* of the side surfaces 241*f* of the through-hole portion 241*a* and the internally threaded portion 241*b*, respectively, thereby forming the deformation portions 100*a* and 100*b*. The deformation portions 100*a* and 100*b* are inserted into the groove portions 241*c* and 241*h* respectively so as to be slightly movable in the longitudinal direction. At this time, as illustrated by a dashed line in FIG. 14 and a chain double-dashed line in FIG. 16, an end surface 241*q* of the nut member 241 is positioned away from the end surface 151*j* of the end portion 100*c* of the upper rail 100 by a predetermined distance towards the center of the upper rail 100.

A connection of each of the attachment brackets 51 and the upper rails 100 according to the fourth embodiment having the aforementioned structure will be explained below. According to the fourth embodiment, in a stage where the bolt 129 is externally inserted to the end portion 100*c* of the upper rail 100 so as to connect the attachment bracket 51 to the upper rail 100, the nut member 241 accommodated within the accommodating portion 151 is supported to be slightly movable in the longitudinal direction while looseness in the vertical direction is restrained by means of the elastic member 238. When the bolt 129 is screwed and tightened, the nut member 241 moves towards the end surface 151*j* of the end portion 100*c* of the upper rail 100 in the same way as in the third embodiment. Then, the deformation portions 100*a* or the deformation portions 100*b* obtained by the sidewall portions 151*e* of the upper rail 100 deformed towards the groove portions 241*c* or the groove portions 241*h* engage with end surfaces 241*s* or the end surfaces 241*t* of the groove portions 241*c* or the groove portions 241*h*. Accordingly, each of the nut members 241 is prevented from being loosen in the vertical direction by means of the elastic member 238 and is prevented from moving in the longitudinal direction. Each of the nut members 241 is stably positioned accordingly. At this time, the end surface 241*q* of the nut member 241 and the engagement portion 51*d* of the attachment bracket 51 are fixed to each other while making contact with each other. In the first attachment bracket 51 where one of the pairs of engagement portions 51*d* is completely mounted on the upper rail 100, the bolt 129 is externally inserted to the other one of the pairs of engagement portions 51*d* of the first attachment bracket 51.

Next, the second attachment bracket 51 not assembled on the upper rails 100 is assembled in the same manner as the third embodiment. The bolt 129 is externally inserted to the end portion 100*c* of one of the upper rails 100. When the bolt 129 is screwed and tightened, the nut member 241 moves towards the end surface 151*j* of the end portion 100*c* of the upper rail 100. The nut member 241 then passes the end surface 151*j* of the end portion 100*c* of the upper rail 100 and continues to move in an axially outward direction through a clearance formed between the engagement portion 51*d* and the end surface 151*j* of the end portion 100*c* until the end surface 241*q* of the nut member 241 makes contact with the engagement portion 51*d* (i.e., an inner end surface thereof) or the clearance therebetween becomes small. At this time, either the deformation portions 100*a* or the deformation portions 100*b* obtained by the sidewall portions 151*e* of the upper rail 100 deformed towards the groove portions 241*c* or the groove portions 241*h* of the nut member 241 engage with either the end surfaces 241*s* or the end surfaces 241*t* of the groove portions 241*c* or the groove portions 241*h*. The movement of the nut member 241 in the longitudinal direction is restricted accordingly. As a result, the pair of engagement portions 51*d* of the attachment bracket 51 is appropriately assembled with a minimum deformation.

As explained above, according to the fourth embodiment, the elastic member 238 is disposed between the nut member 241 and the accommodating portion 151 for covering the upper surface 241*e* and the side surfaces 241*f* of the nut member 241. When the attachment bracket 51 is fixed to the upper rail 100 by means of the bolt 129 meshed to the nut member 241, the nut member 241 moves towards the end surface 151*j* of the end portion 100*c* of the upper rail 100, so that the deformation portions 100*a* or the deformation portions 100*b* of the side surfaces 125*e* or the side surfaces 125*f* of the accommodating portion 151 engage with the groove portions 241*c* or the groove portions 241*h* of the side surfaces 241*f* of the nut member 241. The nut member 241 is fixed to the accommodating portion 151 without being loosened in the tightening direction. Because the nut member 241 is supported by the accommodating portion 151 without looseness via the elastic member 238 in the vertical direction, each of the attachment brackets 51 and the upper rails 100 are securely fixed with a simple structure and a low-cost. In addition, the bolt 129 is externally inserted into the end portion 100*c* of the upper rail 100 along the longitudinal direction of the upper rail 100 so that the bolt 129 is meshed with and tightened to the internal thread 241*n* of the nut member 241. Thus, the attachment bracket 51, which is assembled on the seat member beforehand, is appropriately fixed to the upper rails 100, which leads to a reduction of the assembly hours. Further, because the elastic member 238 is disposed between the nut member 241 and the accommodating portion 151, the nut member 241 is secured in the vertical direction without being loosened and a vibration-proof effect may be obtained during a driving of the vehicle.

In addition, according to the fourth embodiment, the first accommodating portion 151*a* is disposed between the pair of engagement portions 51*d* formed at each of the left and right end portions of the attachment bracket 51. The bolt 129 penetrates through the pair of engagement portions 51*d* in addition to a through-hole 241*m* of the nut member 241 so as to be meshed with and tightened to the internal thread 241*n* of the internally threaded portion 241*b*. As a result, the nut member 241 moves towards the end surfaces 151*j* of the end portion 100*c* of the upper rail 100. The deformation portions 100*a* or the deformation portions 100*b* formed at the sidewall portions (side surfaces) 151*e* or the sidewall portions (side surfaces) 151*f* of the accommodating portion 151 engage with the end surfaces 241*s* or the end surfaces 241*t* of the groove portions 241*c* or the groove portions 241*h* of the side surfaces 241*f* of the nut member 241. As a result, the pair of engagement portions 51*d* of the attachment bracket 51 is supported at both front and rear sides of the first accommodating portion 151*a* by means of the bolt 129. Each of the attachment brackets 51 is assembled on the upper rails 100 with a high rigidity in a balanced manner even by a simple structure for fixation.

Further, according to the fourth embodiment, in an initial state where the deformation portions 100*a* and 100*b* formed at both the side surfaces of the accommodating portion 151 are inserted into the respective groove portions 241*c* and 241*h* formed at both the side surfaces of the nut member 241, the end surface 241q of the nut member 241 facing the end surface 151j of the end portion 100c of the upper rail 100 is positioned away therefrom towards the center of the upper rail 100. Thus, when the attachment bracket 51 is assembled on the upper rails 100, the pair of engagement portions 51d is prevented from interfering with the nut member 241. In addition, in a state where the deformation portions 100a or the deformation portions 100b engage with the end surfaces 241s or the end surfaces 241t of the groove portions 241c or the groove portions 241h in association with the movement of the nut member 241 towards the end surface 151j of the end portion 100c of the upper rail 100 when the bolt 129 penetrating through the bolt attachment bores 55e and 56e formed at the attachment bracket 51 is meshed with the nut member 241, the end surface 241q of the nut member 241 projects in an axially outer direction from the end surface 151j of the end portion 100c of the upper rail 100. Accordingly, even when the position of the engagement portion 51d of the attachment bracket 51 is deviated in the longitudinal direction of the upper rail 100, the nut member 241 into which the bolt 129 is screwed moves in the longitudinal direction of the upper rail 100 so as to absorb the position deviation of the engagement portion 51d. As a result, the attachment bracket 51 can be assembled without receiving an excess stress, which leads to an improved reliability.

The third and fourth embodiments have been explained separately. Alternatively, the third and fourth embodiments may be achieved at the same time. In the third embodiment, the elastic member 238 may be disposed when each of the nut members 141 is accommodated within the accommodating portion 151 of the upper rail 100. In addition, in the fourth embodiment, the groove portion 141c having the tapered groove portion 141d that is gradually narrower towards the center of the upper rail 100 may be formed at each side surface of the nut member 241, thereby further improving reliability.

According to the third and fourth embodiments, the seat member supported at an upper side of each of the attachment brackets 51 may be appropriately configured. For example, a seat member having a sliding function in right and left directions, a seat member having a rotational function in addition to the sliding function, and the like may be applicable. According to such seat members, the same effect as that obtained by the seat member explained above may be expected.

In addition, according to the third and fourth embodiments, the attachment brackets 51 are provided to connect the seat member and the upper rails 100. Alternatively, without the attachment brackets 51, an engagement portion formed into a flange shape that corresponds to the engagement portion 51d of the attachment bracket 51 may be formed at a frame, and the like constituting the seat member. According to such structure, the same effect as that obtained by the case where the attachment brackets 51 are provided may be obtained.

Further, according to the third and fourth embodiments, the accommodating portion 151 and the nut member 141, 241 are divided by the first and second slits 300 and 400, respectively. Alternatively, the accommodating portion 151 and the nut member 141, 241 may be each integrally formed without having the slits 300 and 400. Then, the internal thread 141n, 241n may be provided at a portion of the through-hole 141m, 241m of each of the nut members 141, 241.

Generally, in order to fix a seat member to an upper rail, a connection portion provided at a lower portion of the seat member and an attachment portion provided at the upper rail are connected and tightened to each other by means of a bolt, and the like. JP2001-171396A (hereinafter referred to as Reference 2) and JP2004-90765A (hereinafter referred to as Reference 3) each disclose such seat apparatus for a vehicle. In Reference 2, a fixed rail is fixed to a floor of a vehicle by means of a front floor bracket and a rear floor bracket. A stud bolt is provided in a projecting manner at an upper surface of a movable rail serving as an upper rail and having a substantially L-shape in a cross section. An engagement portion provided at the seat member is attached to the stud bolt having the projecting shape so that the stud bolt is inserted into the engagement portion. The engagement portion of the seat member is tightened to the stud bolt of the upper rail by means of a nut so that the seat member is fixed to the upper rail.

In Reference 3, stepped portions are respectively formed at front and rear end surfaces of an upper rail having a substantially inverse U-shape in a cross section. Nut members (front and rear nut members) are in contact with the stepped portions, respectively. Each of the nut members includes fin portions by which an outer peripheral surface of the upper rail is sandwiched. In such state, the nut members are welded to the upper rail. Then, brackets (front and rear brackets) provided at the seat member and each having an end surface facing and matching an end surface of each of the nut members in longitudinal and vertical directions are fixed to the respective nut members by means of bolts, and the like.

According to the seat apparatus disclosed in Reference 2, the engagement portion of the seat member is attached to the stud bolt having the projecting shape so that the stud bolt is inserted into the engagement portion. Then, the engagement portion is tightened to the stud bolt by the nut from an upper side. Thus, at the time of tightening, the seat apparatus should be in a partly assembled state. That is, the seat apparatus is necessarily fully assembled after the engagement portion is tightened to the stud bolt, which may lead to a complicated assembly procedure.

In addition, according to the seat apparatus disclosed in Reference 3, in order to tighten the front and rear nut members provided at the upper rail to the seat member, a distance between the front and rear brackets provided at the seat member is structurally necessarily longer than a distance between the front and rear nut members. Therefore, when the nut members are tightened to the respective brackets provided at the seat member, the brackets may be plastically deformed by means of a tightening axial force, which leads to an increase of internal stress, a deterioration of mounting accuracy, and the like.

According to the aforementioned first and second embodiments, a load applied from the second lower rail 60 of the width-directional sliding mechanism 6 is received by the both-end supporting mechanism formed by the pair of engagement portions 36a and 36b of the attachment bracket 5. Thus, a large bending moment that may be generated by receiving the load by a known cantilevered mechanism (one-end supporting mechanism) is prevented. Accordingly, even when a relatively lightweight member is used for the attachment bracket 5 so as to attach the second lower rail 60 of the width-directional sliding mechanism 6 to the upper portion of the first upper rail 10 of the longitudinal sliding mechanism 4, the second lower rail 60 is firmly connected to the first upper rails 10.

According to the aforementioned first and second embodiments, the accommodating portion 15 having a pouch-shape in a cross section is formed at the upper portion of the first upper rail 10, and the accommodating portion 15 includes the upper wall portion 16 and the sidewall portions 17 facing each other. The pair of engagement portions 36a and 36b of the attachment bracket 5 includes the engagement holes 34 respectively that open in the longitudinal direction of the vehicle. An axial end portion of the accommodating portion 15 of the first upper rail 10 is divided into the first accommodating portion 15a and the second accommodating portion 15b by the slit 30 into which one of the pair of engagement portions 36a and 36b of the attachment bracket 5 is inserted from an upper side of the first upper rail 10. The attachment bracket 5 and the first upper rail 10 are connected to each other when the fastening bolt 58 penetrating through the pair of engagement portions 36a and 36b is fixed within the accommodating portion 15 in a state where the first accommodating portion 15a is disposed between the pair of engagement portions 36a and 36b.

The engagement portion 36a of the attachment bracket 5 is inserted into the slit 30 formed at the upper portion of the first upper rail 10 so that the first accommodating portion 15a is sandwiched between the engagement portions 36a and 36b while the fastening bolt 58 penetrating through the pair of engagement holes 34 is fixed within the accommodating portion 15. Consequently, the both-end supporting mechanism is easily configured to thereby firmly connect the first upper rail 10 and the second lower rail 60 to each other. In addition, the connecting position between the first upper rail 10 and the second lower rail 60 is easily changed by changing the position of the slit 30 of the first upper rail 10.

In addition, the accommodating portion 15 accommodates the nut member 42 to which the fastening bolt 58 is screwed.

The fastening bolt 58 screwed to the nut member 42 may easily and promptly achieve the both-end supporting mechanism, thereby firmly connecting the first upper rail 10 and the second lower rail 60 to each other.

The seat apparatus 2, 102 further includes the load transmitting pin 84, 105 fixed to the second upper rail 62 and extending downwardly in a movable manner in the width direction of the vehicle relative to the attachment bracket 5, and the load transmitting pin 84, 105 is engageable with the attachment bracket 5 while being restricted to move in the vertical direction.

Because the load transmitting pin 84, 105 is fixed to the upper wall portion 72 of the second upper rail 62 and is movable relative to the attachment bracket 5 in the width direction of the vehicle, the second upper rail 62 of the width-directional sliding mechanism 6 may smoothly slide along the second lower rail 60 without being prevented from moving in the width direction of the vehicle by the load transmitting pin 84, 105. In addition, the load transmitting pin 84, 105 is engageable with the attachment bracket 5 so as not to move in the vertical direction. The load acting on the second upper rail 62 in the vertical direction is therefore transmitted to the attachment bracket 5. The vertical load is partially received by the attachment bracket 5. Accordingly, a support portion that supports the second upper rail 62 to be slidable relative to the second lower rail 60 does not necessarily fully receive the load from the second upper rail 62. The load from the second upper rail 62 is supported by the attachment bracket 5 via the load transmitting pin 84, 105 and is divided by the second upper rail 62, the second lower rail 60, and the attachment bracket 5, thereby improving the mechanical strength of the seat apparatus 2, 102 and enhancing the safety thereof.

Further, the elongated holes 52 and 53 are formed at the center in the longitudinal direction of the vehicle of the upper wall portion 50 of the attachment bracket 5 and at the center in the longitudinal direction of the vehicle of the bottom wall portion 66 of the second lower rail 60 respectively, the elongated holes 52 and 53 extending in the width direction of the vehicle. The load transmitting pin 84, 105 includes the upper shaft portion 86, 154 fixed to the upper wall portion 72 of the second upper rail 62. The lower end of the upper shaft portion 86, 158 is in contact with the upper peripheral edge surface 53a of the elongated hole 53 of the second lower rail 60. The lower shaft portion 89, 158 extends downwardly from the upper shaft portion 86, 154 and penetrates through the elongated holes 52 and 53 while having the small clearance t1, t2 therewith. The flanged nut 95 is formed at the lower end of the lower shaft portion 89, 158 and in contact with the lower peripheral edge surface 52a of the elongated hole 52 of the attachment bracket 5.

The load transmitting pin 84, 105 fixed to the second upper rail 62 is movable along the elongated holes 52 and 53 in a condition where the lower shaft portion 89, 158 of the load transmitting pin 84, 105 penetrates through the elongated holes 52 and 53. The second upper rail 62 smoothly slides relative to the second lower rail 60 accordingly. In addition, the upper shaft portion 86, 158 of the load transmitting pin 84, 105 is fixed to the second upper rail 62 and the lower end portion of the upper shaft portion 86, 154 makes contact with the upper peripheral edge surface 53a of the elongated hole 53. Accordingly, a downwardly compressive load received by the second upper rail 62 is transmitted to the attachment bracket 5 and partially received thereby. Furthermore, when an upward detaching load is applied to the second upper rail 62, the flanged nut 95 arranged at the lower end of the lower shaft portion 89, 158 extending downwardly from the upper shaft portion 86, 154 makes contact with the lower peripheral edge surface 52a of the elongated hole 52 of the attachment bracket 5. Accordingly, the upward detaching load received by the second upper rail 62 is transmitted to the attachment bracket 5 and partially received thereby. As a result, the supporting portion that supports the second upper rail 62 to be slidable relative to the second lower rail 60 does not necessarily fully receive the upward detaching load. Further, the upward detaching load from the second upper rail 62 is received by the attachment bracket 5 via the load transmitting pin 84, 105 and is divided by the second upper rail 62, the second lower rail 60, and the attachment bracket 5.

According to the aforementioned third embodiment, the nut member 141 including the internal thread 141n is movably accommodated within the accommodating portion 151 in a longitudinal direction thereof, the nut member 141 including the groove portion 141c at the side surface 141f in contact with the accommodating portion 151, the groove portion 141c extending in a direction similar to a screwing direction of the internal thread 141n of the nut member 141 and having the tapered groove portion 141d of which an end portion is gradually narrower towards a center portion of the upper rail 100. The upper rail 100 includes the deformation portion 100a, 100b formed at the side surface 151e of the accommodating portion 151 and inserted into the groove portion 141c formed at the side surface 141f of the nut member 141, the deformation portion 100a, 100b engaging with the tapered groove portion 141d in association with a movement of the nut member 141 towards the end surface 151j of the end portion 100c of the upper rail 100 in a case where the attachment bracket 51 is fixed to the upper rail 100 by the bolt 129 meshed with the nut member 141.

Accordingly, when the attachment bracket 51 is fixed to the upper rail 100 by means of the bolt 129 meshed to the nut member 141, the nut member 141 moves towards the end surface of the end portion 100c of the upper rail 100. The deformation portion 100a, 100b formed at the side surface of the accommodating portion 151 engages with the tapered groove portion 141d formed at the side surface of the nut member 141 so that the nut member 141 is fixed within the accommodating portion 151 without looseness in the vertical direction and the longitudinal direction. Thus, the attachment bracket 51 and the upper rail 100 are securely fixed to each other with a simple and low-cost structure. In addition, because the bolt 129 is externally inserted in the longitudinal direction of the upper rail 100 into the end portion 100c of the upper rail 100 so as to be meshed with and tightened to the internal thread 141n of the nut member 141, the attachment bracket 51 assembled on the seat member beforehand is fixed to the upper rail 100, which leads to a reduction of assembly hours.

According to the aforementioned third embodiment, the slit includes the first slit 300 formed at a portion of the accommodating portion in the longitudinal direction thereof. An upper portion of the nut member 141 is divided into the through-hole portion 141a and the internally threaded portion 141b including the internal thread 141n by the second slit 400 having the same width as a width of the first slit 300, the groove portion 141c having the tapered groove portion 141d being formed at one of the side surfaces 141f of the through-hole portion 141a and the internally threaded portion 141b. The first accommodating portion 151a is disposed between the pair of engagement portions 51d formed at the attachment bracket 51. The deformation portion 100a engages with the tapered groove portion 141d in association with the movement of the nut member 141 towards the end surface 151j of the end portion 100c of the upper rail 100 in a case where the attachment bracket 51 is fixed to the upper rail 100 by the bolt 129 penetrating through the through-hole portion 141a and meshed with the internal thread 141n of the internally threaded portion 141b.

Accordingly, the pair of engagement portions 51d of the attachment bracket 51 is supported by both sides of the first accommodating portion 151a formed at an end of the upper rail 100. Thus, even by a simple structure for fixation, the attachment bracket 51 is assembled on the upper rail 100 at a high rigidity in a balanced manner.

According to the aforementioned fourth embodiment, the nut member 241 including the internal thread 241n is movably accommodated within the accommodating portion 151 in a longitudinal direction thereof, the nut member 241 including the groove portion 241c, 241h at the side surface 241f in contact with the accommodating portion 151, the groove portion 241c, 241h extending in a direction similar to a screwing direction of the internal thread 241n of the nut member 241. The elastic member 238 is disposed between the nut member 241 and the accommodating portion 151 to cover the upper surface 241e and the side surface 241f of the nut member 241. The upper rail 100 includes the deformation portion 100a, 100b formed at the side surface 151e of the accommodating portion 151 and inserted into the groove portion 241c, 241h formed at the side surface 241f of the nut member 241, the deformation portion 100a engaging with the end surface 241s, 241t of the groove portion 241c, 241h in association with a movement of the nut member 241 towards the end surface 151j of the end portion 100c of the upper rail 100 in a case where the attachment bracket 51 is fixed to the upper rail 100 by the bolt 129 meshed with the nut member 241.

As a result, the nut member 241 is fixed within the accommodating portion 151 without looseness in the tightened direction. In addition, the nut member 241 is fixed within the accommodating portion 151 without looseness in the vertical direction because of the elastic member 238 disposed between the nut member 241 and the accommodating portion 150. Thus, the attachment bracket 51 and the upper rail 100 are securely fixed to each other with a simple and low-cost structure. Because the bolt 129 is externally inserted to the end portion 100c of the upper rail 100 along the longitudinal direction of the upper rail 100 so as to be meshed with and tightened to the internal thread 241n of the nut member 241, the attachment bracket 51 assembled on the seat member beforehand is fixed to the upper rail 100, which leads to a reduction of the assembly hours. Further, the elastic member 238 being disposed between the nut member 241 and the accommodating portion 151 restrains looseness of the nut member 241 in the vertical direction and obtains the vibration preventive effect when the vehicle is driven.

According to the aforementioned fourth embodiment, the slit includes the first slit 300 formed at a portion of the accommodating portion 151 in the longitudinal direction thereof. An upper portion of the nut member 241 is divided into the through-hole portion 241a and the internally threaded portion 241b including the internal thread 241n by the second slit 400 having the same width as a width of the first slit 300, the groove portion 241c, 241h being formed at one of the side surfaces 241f of the through-hole portion 241a and the internally threaded portion 241b. The first accommodating portion 151a is disposed between the pair of engagement portions 51d formed at the attachment bracket 51, and the deformation portion 100a, 100b engages with the end surface 241s, 241t of the groove portion 241c, 241h in association with the movement of the nut member 241 towards the end surface 151j of the end portion 100c of the upper rail 100 in a case where the attachment bracket 51 is fixed to the upper rail 100 by the bolt 129 penetrating through the through-hole portion 241a and meshed with the internal thread 241n of the internally threaded portion 241b.

Accordingly, the pair of engagement portions 51d of the attachment bracket 51 supports the first accommodating portion 151a at both sides, thereby assembling the attachment bracket 51 on the upper rails 100 with a high rigidity in a balanced manner even by a simple structure for fixation. Further, because the elastic member 238 is disposed between the nut member 241 and the accommodating portion 151, looseness of the nut member 241 in the vertical direction is restrained and the vibration proof effect may be obtained.

According to the aforementioned third and fourth embodiments, the end surface 141q, 241q of the nut member 141, 241 facing the end surface 151j of the end portion 100c of the upper rail 100 is positioned away therefrom towards the center portion of the upper rail 100 in an initial state where the deformation portion 100a, 100b formed at the side surface 151e of the accommodating portion 151 is inserted into the groove portion 141c, 141h, 241c, 241h formed at the side surface of the nut member 141, 241. The end surface 141q, 241q of the nut member 241 projects in an axially outer direction from the end surface 151j of the end portion 100c of the upper rail 100 in a state where the deformation portion 100a, 100b engages with the tapered groove portion 141d of the groove portion 141c or the end surface 241s, 241t of the groove portion 241s, 241h in association with the movement of the nut member 141, 241 towards the end surface 151j of the end portion 100c of the upper rail 100 when the bolt 129 penetrates through the attachment bore 55e formed at the attachment bracket 51 and is meshed with the nut member 141, 241.

Accordingly, even when a positional deviation occurs in the engagement portion 51d of the attachment bracket 51 in the longitudinal direction of the upper rail 100, the nut member 141, 241 screwed to the bolt 129 absorbs the positional deviation by moving in the longitudinal direction of the upper rail 100. The attachment bracket 51 is assembled, without receiving an excess stress, thereby improving reliability.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
a longitudinal sliding mechanism including a first lower rail adapted to be fixed to a vehicle floor and extending in a longitudinal direction of the vehicle and a first upper rail supported to be slidable relative to the first lower rail;
a width-directional sliding mechanism including a second lower rail mounted on the first upper rail and extending in a width direction of the vehicle and a second upper rail supported to be slidable relative to the second lower rail and adapted to be fixed to a seat frame member; and
an attachment bracket extending in parallel to the second lower rail and including an upper wall portion and first and second engagement portions which extend downwardly from the upper wall portion while facing each other in the longitudinal direction of the vehicle and which are supported by the first upper rail, wherein the second lower rail is fixed between the first and second engagement portions of the attachment bracket.

2. The seat apparatus according to claim 1, wherein
an accommodating portion having a pouch-shape in a cross section is formed at an upper portion of the first upper rail, the accommodating portion including an upper wall portion and sidewall portions facing each other,
the first and second engagement portions of the attachment bracket include engagement holes respectively that open in the longitudinal direction of the vehicle,
an axial end portion of the accommodating portion of the first upper rail is divided into a first accommodating portion and a second accommodating portion by a slit into which one of the first and second engagement portions of the attachment bracket is inserted from an upper side of the first upper rail, and
the attachment bracket and the first upper rail are connected to each other when a connecting member penetrating through the first and second engagement portions is fixed within the accommodating portion in a state where the first accommodating portion is disposed between the first and second engagement portions.

3. The seat apparatus according to claim 2, wherein the accommodating portion accommodates a nut member to which the connecting member is screwed.

4. The seat apparatus according to claim 1, further comprising a load transmitting member fixed to the second upper rail and extending downwardly in a movable manner in the width direction of the vehicle relative to the attachment bracket, the load transmitting member being engageable with the attachment bracket while being restricted to move in the vertical direction.

5. The seat apparatus according to claim 2, further comprising a load transmitting member fixed to the second upper rail and extending downwardly in a movable manner in the width direction of the vehicle relative to the attachment bracket, the load transmitting member being engageable with the attachment bracket while being restricted to move in the vertical direction.

6. The seat apparatus according to claim 3, further comprising a load transmitting member fixed to the second upper rail and extending downwardly in a movable manner in the width direction of the vehicle relative to the attachment bracket, the load transmitting member being engageable with the attachment bracket while being restricted to move in the vertical direction.

7. The seat apparatus according to claim 4, wherein
elongated holes are formed at a center in the longitudinal direction of the vehicle of the upper wall portion of the attachment bracket and at a center in the longitudinal direction of the vehicle of a bottom wall portion of the second lower rail respectively, the elongated holes extending in the width direction of the vehicle, and
the load transmitting member includes an upper shaft portion fixed to an upper wall portion of the second upper rail, a lower end of the upper shaft portion being in contact with an upper peripheral edge surface of the elongated hole of the second lower rail, a lower shaft portion extending downwardly from the upper shaft portion and penetrating through the elongated holes while having a small clearance therewith, and a flanged portion formed at a lower end of the lower shaft portion and in contact with a lower peripheral edge surface of the elongated hole of the attachment bracket.

8. The seat apparatus according to claim 5, wherein
elongated holes are formed at a center in the longitudinal direction of the vehicle of the upper wall portion of the attachment bracket and at a center in the longitudinal direction of the vehicle of a bottom wall portion of the second lower rail respectively, the elongated holes extending in the width direction of the vehicle, and
the load transmitting member includes an upper shaft portion fixed to an upper wall portion of the second upper rail, a lower end of the upper shaft portion being in contact with an upper peripheral edge surface of the elongated hole of the second lower rail, a lower shaft portion extending downwardly from the upper shaft portion and penetrating through the elongated holes while having a small clearance therewith, and a flanged portion formed at a lower end of the lower shaft portion and in contact with a lower peripheral edge surface of the elongated hole of the attachment bracket.

9. The seat apparatus according to claim 6, wherein
elongated holes are formed at a center in the longitudinal direction of the vehicle of the upper wall portion of the attachment bracket and at a center in the longitudinal direction of the vehicle of a bottom wall portion of the second lower rail respectively, the elongated holes extending in the width direction of the vehicle, and
the load transmitting member includes an upper shaft portion fixed to an upper wall portion of the second upper rail, a lower end of the upper shaft portion being in contact with an upper peripheral edge surface of the elongated hole of the second lower rail, a lower shaft portion extending downwardly from the upper shaft portion and penetrating through the elongated holes while having a small clearance therewith, and a flanged portion formed at a lower end of the lower shaft portion and in contact with a lower peripheral edge surface of the elongated hole of the attachment bracket.

10. The seat apparatus according to claim 3, wherein
the nut member including an internal thread is movably accommodated within the accommodating portion in a longitudinal direction thereof, the nut member including a groove portion at a side surface in contact with the accommodating portion, the groove portion extending in a direction similar to a screwing direction of the internal thread of the nut member and having a tapered groove portion of which an end portion is gradually narrower towards a center portion of the first upper rail, and the first upper rail includes a deformation portion formed at a side surface of the accommodating portion and inserted into the groove portion formed at the side surface of the nut member, the deformation portion engaging with the tapered groove portion in association with a movement of the nut member towards an end surface of an end portion of the first upper rail in a case where the attachment bracket is fixed to the first upper rail by the connecting member meshed with the nut member.

11. The seat apparatus according to claim 10, wherein the slit includes a first slit formed at a portion of the accommodating portion in the longitudinal direction thereof, an upper portion of the nut member is divided into a through-hole portion and an internally threaded portion including the internal thread by a second slit having a same width as a width of the first slit, the groove portion having the tapered groove portion being formed at one of side surfaces of the through-hole portion and the internally threaded portion, the first accommodating portion is disposed between the first and second engagement portions formed at the attachment bracket, and the deformation portion engages with the tapered groove portion in association with the movement of the nut member towards the end surface of the end portion of the first upper rail in a case where the attachment bracket is fixed to the first upper rail by the connecting member penetrating through the through-hole portion and meshed with the internal thread of the internally threaded portion.

12. The seat apparatus according to claim 3, wherein the nut member including an internal thread is movably accommodated within the accommodating portion in a longitudinal direction thereof, the nut member including a groove portion at a side surface in contact with the accommodating portion, the groove portion extending in a direction similar to a screwing direction of the internal thread of the nut member, an elastic member is disposed between the nut member and the accommodating portion to cover an upper surface and the side surface of the nut member, and the first upper rail includes a deformation portion formed at a side surface of the accommodating portion and inserted into the groove portion formed at the side surface of the nut member, the deformation portion engaging with an end surface of the groove portion in association with a movement of the nut member towards an end surface of an end portion of the first upper rail in a case where the attachment bracket is fixed to the first upper rail by the connecting member meshed with the nut member.

13. The seat apparatus according to claim 12, wherein the slit includes a first slit formed at a portion of the accommodating portion in the longitudinal direction thereof, an upper portion of the nut member is divided into a through-hole portion and an internally threaded portion including an internal thread by a second slit having a same width as a width of the first slit, the groove portion being formed at one of side surfaces of the through-hole portion and the internally threaded portion, the first accommodating portion is disposed between the first and second engagement portions formed at the attachment bracket, and the deformation portion engages with the end surface of the groove portion in association with the movement of the nut member towards the end surface of the end portion of the first upper rail in a case where the attachment bracket is fixed to the first upper rail by the connecting member penetrating through the through-hole portion and meshed with the internal thread of the internally threaded portion.

14. The seat apparatus according to claim 10, wherein an end surface of the nut member facing the end surface of the end portion of the first upper rail is positioned away therefrom towards the center portion of the first upper rail in an initial state where the deformation portion formed at the side surface of the accommodating portion is inserted into the groove portion formed at the side surface of the nut member, and the end surface of the nut member projects in an axially outer direction from the end surface of the end portion of the upper rail in a state where the deformation portion engages with the tapered groove portion of the groove portion in association with the movement of the nut member towards the end surface of the end portion of the first upper rail when the connecting member penetrates through an attachment bore formed at the attachment bracket and is meshed with the nut member.

15. The seat apparatus according to claim 11, wherein an end surface of the nut member facing the end surface of the end portion of the first upper rail is positioned away therefrom towards the center portion of the first upper rail in an initial state where the deformation portion formed at the side surface of the accommodating portion is inserted into the groove portion formed at the side surface of the nut member, and the end surface of the nut member projects in an axially outer direction from the end surface of the end portion of the upper rail in a state where the deformation portion engages with the tapered groove portion of the groove portion in association with the movement of the nut member towards the end surface of the end portion of the first upper rail when the connecting member penetrates through an attachment bore formed at the attachment bracket and is meshed with the nut member.

16. The seat apparatus according to claim 12, wherein an end surface of the nut member facing the end surface of the end portion of the first upper rail is positioned away therefrom towards the center portion of the first upper rail in an initial state where the deformation portion formed at the side surface of the accommodating portion is inserted into the groove portion formed at the side surface of the nut member, and the end surface of the nut member projects in an axially outer direction from the end surface of the end portion of the upper rail in a state where the deformation portion engages with the end surface of the groove portion in association with the movement of the nut member towards the end surface of the end portion of the first upper rail when the connecting member that penetrates through an attachment bore formed at the attachment bracket meshed with the nut member.

17. The seat apparatus according to claim 13, wherein an end surface of the nut member facing the end surface of the end portion of the first upper rail is positioned away therefrom towards the center portion of the first upper rail in an initial state where the deformation portion formed at the side surface of the accommodating portion is inserted into the groove portion formed at the side surface of the nut member, and the end surface of the nut member projects in an axially outer direction from the end surface of the end portion of the upper rail in a state where the deformation portion engages with the end surface of the groove portion in association with the movement of the nut member towards the end surface of the end portion of the first upper rail when the connecting member that penetrates through an attachment bore formed at the attachment bracket meshed with the nut member.

18. A vehicle seat apparatus comprising:
- a longitudinal sliding mechanism possessing a first lower rail and a first upper rail slidably connected to the first lower rail, the first lower rail extending in a longitudinal direction of the vehicle and being connectable to a vehicle floor;
- a width-directional sliding mechanism possessing a second lower rail and a second upper rail slidably connected to the second lower rail, the second lower rail being mounted on the first upper rail and extending in a width direction of the vehicle, and the second upper rail being connectable to a seat frame member;
- an attachment bracket extending parallel to the second lower rail and possessing an upper wall portion, a first engagement portion, and a second engagement portion, the first and second engagement portions extending downwardly away from the upper wall portion and facing one another, the first and second engagement portions being supported by the first upper rail at respective spaced apart locations; and
- a connector positioned inwardly of the first and second engagement portions and connecting the second lower rail to the attachment bracket.

19. The vehicle seat apparatus of claim 18, wherein the connector extends through a hole in the second lower rail and a hole in the upper wall portion of the attachment bracket.

20. A vehicle seat apparatus comprising:
- a longitudinal sliding mechanism possessing a first lower rail and a first upper rail slidably connected to the first lower rail, the first lower rail extending in a longitudinal direction of the vehicle and being connectable to a vehicle floor;
- a width-directional sliding mechanism possessing a second lower rail and a second upper rail slidably connected to the second lower rail, the second lower rail being mounted on the first upper rail and extending in a width direction of the vehicle, and the second upper rail being connectable to a seat frame member;
- an attachment bracket extending parallel to the second lower rail and possessing an upper wall portion, a first engagement portion, and a second engagement portion, the first and second engagement portions extending downwardly away from the upper wall portion and facing one another, the first and second engagement portions each possessing a free end remote from the upper wall portion; and
- a connector positioned inwardly of the first and second engagement portions and connecting the second lower rail to the attachment bracket.

* * * * *